US010938451B2

(12) United States Patent
Ramasamy et al.

(10) Patent No.: US 10,938,451 B2
(45) Date of Patent: Mar. 2, 2021

(54) METHOD AND APPARATUS FOR OPERATING AN ANTENNA CO-EXISTENCE CONTROLLER

(71) Applicant: Dell Products, LP, Round Rock, TX (US)

(72) Inventors: Suresh K. Ramasamy, Austin, TX (US); Ching Wei Chang, Cedar Park, TX (US); Youngsoo Cho, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/803,497

(22) Filed: Nov. 3, 2017

(65) Prior Publication Data
US 2019/0140705 A1 May 9, 2019

(51) Int. Cl.
*H04B 7/04* (2017.01)
*H04B 7/155* (2006.01)
(Continued)

(52) U.S. Cl.
CPC ............. *H04B 7/0404* (2013.01); *H04B 7/04* (2013.01); *H04B 7/15564* (2013.01);
(Continued)

(58) Field of Classification Search
CPC . H04B 7/0404; H04B 7/15564; H04W 88/06; H04W 88/10; H04W 16/14; H04W 52/04
See application file for complete search history.

(56) References Cited

U.S. PATENT DOCUMENTS 7,899,396 B2 * 3/2011 Meylan ................. H04W 16/14
455/41.2
7,907,033 B2 3/2011 Morris, III
(Continued)

FOREIGN PATENT DOCUMENTS

EP 2978198 A1 1/2016

OTHER PUBLICATIONS

A. Raghavan, "Interference Cancellation for Collocated Wireless Radios," Aug. 2007, 120 pages.

*Primary Examiner* — Alpus Hsu
(74) *Attorney, Agent, or Firm* — Prol Intellectual Property Law, PLLC; H. Kenneth Prol

(57) ABSTRACT

A mobile information handling system may comprise a plurality of transceiving antennas transmitting N×N WLAN signals and M×M WWAN signals according to a preset antenna configuration, mounted in a case for the mobile information handling system and a processor executing machine readable executable code instructions of the dynamic wireless antenna co-existence control system to receive an indication of co-location interference and an identification of the M×M WWAN signals as a victim signal negatively impacted by the co-location interference, instruct a first interference controller operably connected to the processor and a first tunable impedance matching circuit to route the victim signal from a first one of the plurality of transceiving antennas to a WWAN radio modem via the first tunable impedance matching circuit, and instruct the first tunable impedance matching circuit to apply an impedance adjustment that maximizes the port isolation of an antenna port for the first WWAN transceiving antenna.

20 Claims, 10 Drawing Sheets

(51) Int. Cl.
   *H04W 88/06*   (2009.01)
   *H04W 88/10*   (2009.01)
   *H04B 7/0404*  (2017.01)
   *H04W 52/04*   (2009.01)
   *H04W 16/14*   (2009.01)

(52) U.S. Cl.
   CPC ........... *H04W 16/14* (2013.01); *H04W 52/04* (2013.01); *H04W 88/06* (2013.01); *H04W 88/10* (2013.01)

(56) References Cited

U.S. PATENT DOCUMENTS

| | | | | |
|---|---|---|---|---|
| 8,121,068 | B2 * | 2/2012 | Zhu | H04W 48/16 370/326 |
| 8,269,683 | B2 | 9/2012 | McKinzie | |
| 8,750,264 | B2 * | 6/2014 | Shatti | H04B 7/026 370/338 |
| 8,781,522 | B2 * | 7/2014 | Tran | H01Q 1/22 343/745 |
| 8,831,655 | B2 * | 9/2014 | Burchill | H04W 52/243 455/501 |
| 8,957,827 | B1 | 2/2015 | Lee | |
| 9,049,042 | B2 * | 6/2015 | Tagg | H04L 12/2856 |
| 9,088,924 | B2 * | 7/2015 | Fu | H04W 24/10 |
| 9,338,588 | B1 * | 5/2016 | Patel | H04M 1/7253 |
| 9,451,630 | B2 * | 9/2016 | Chen | H04W 72/1215 |
| 9,743,440 | B2 * | 8/2017 | Wietfeldt | H04L 67/104 |
| 9,749,925 | B2 * | 8/2017 | Chrisikos | H04B 15/00 |
| 9,853,684 | B2 * | 12/2017 | Boire | H01Q 21/0006 |
| 9,907,114 | B2 * | 2/2018 | Sahota | H04W 84/12 |
| 10,064,208 | B2 * | 8/2018 | Chrisikos | H04W 72/1231 |
| 10,123,156 | B2 * | 11/2018 | Butler | H04B 5/0012 |
| 10,129,757 | B2 * | 11/2018 | Noellert | H04W 16/14 |
| 10,136,395 | B1 * | 11/2018 | Koshy | H04W 52/223 |
| 2003/0030504 | A1 | 2/2003 | Dixit | |
| 2007/0197180 | A1 | 8/2007 | McKinzie, III | |
| 2010/0164645 | A1 | 7/2010 | Kobayashi | |
| 2012/0058739 | A1 | 3/2012 | McKinzie, III | |
| 2013/0187712 | A1 | 7/2013 | Cabanillas | |
| 2015/0139015 | A1 * | 5/2015 | Kadous | H04W 24/08 370/252 |

* cited by examiner

SISO TUNABLE CIRCUIT CONFIGURATION TABLE 302

| Wi-Fi Modes | Antenna Configuration ||||  Tunable Circuit Configuration ||
|---|---|---|---|---|---|---|
| | WLAN Main Antenna | WLAN AUX Antenna | WWAN Main Antenna | WWAN AUX Antenna | Co-Location Interference Victim | Tunable Circuit Combination(s) |
| WLAN 1x1 WWAN OFF (304) | ON | OFF | OFF | OFF | N/A | T1D |
| | OFF | ON | OFF | OFF | N/A | T4D |
| WLAN OFF WWAN 1x1 (306) | OFF | OFF | ON | OFF | N/A | T2D |
| | OFF | OFF | OFF | ON | N/A | T5D |
| WLAN 2x2 WWAN OFF (308) | ON | ON | OFF | OFF | N/A | T1D+T4D |
| WLAN OFF WWAN 2x2 (310) | OFF | OFF | ON | ON | N/A | T2D+T5D |

FIG. 3

WLAN 1x1 AND WWAN 1x1 TUNABLE CIRCUIT CONFIGURATION TABLE 402

| Wi-Fi Modes | Antenna Configuration | | | | Tunable Circuit Configuration | |
|---|---|---|---|---|---|---|
| | WLAN Main Antenna | WLAN AUX Antenna | WWAN Main Antenna | WWAN AUX Antenna | Signal Causing Co-Location Interference | Tunable Circuit Combination(s) |
| WLAN 1x1 WWAN 1x1 | ON | OFF | ON | OFF | WLAN | T1D+T2C |
| | ON | OFF | ON | OFF | WLAN | T1D+T2C+T3C |
| | OFF | ON | OFF | ON | WLAN | T4D+T5C |
| | OFF | ON | OFF | ON | WLAN | T4D+T5C+T6C |
| | ON | OFF | ON | OFF | WWAN | T1C+T2D |
| | ON | OFF | ON | OFF | WWAN | T1C+T3C+T2D |
| | OFF | ON | OFF | ON | WWAN | T4C+T5D |
| | OFF | ON | OFF | ON | WWAN | T4C+T6C+T5D |

404 WWAN SIGNAL CAUSING INTERFERENCE (rows 1–4)
406 WLAN SIGNAL CAUSING INTERFERENCE (rows 5–8)

FIG. 4

WLAN 2x2 AND WWAN 1x1 TUNABLE CIRCUIT CONFIGURATION TABLE 502

| Wi-Fi Modes | Antenna Configuration | | | | Tunable Circuit Configuration | | |
|---|---|---|---|---|---|---|---|
| | WLAN Main Antenna | WLAN AUX Antenna | WWAN Main Antenna | WWAN AUX Antenna | Aggressor Signal | Tunable Circuit Combination(s) | |
| WLAN 2x2 | ON | ON | ON | OFF | WLAN Main | T1D+T4D+T2C | ⎫ 504 WLAN SIGNAL CAUSING INTERFERENCE |
| | ON | ON | ON | OFF | WLAN Main | T1D+T4D+T2C+T3C | |
| | ON | ON | OFF | ON | WLAN Aux | T1D+T4D+T5C | |
| | ON | ON | OFF | ON | WLAN Aux | T1D+T4D+T5C+T6C | ⎭ |
| WWAN 1x1 | ON | ON | ON | OFF | WWAN | T2D+T1C+T4D | ⎫ 506 WWAN SIGNAL CAUSING INTERFERENCE |
| | ON | ON | ON | OFF | WWAN | T2D+T1C+T3C+T4D | |
| | ON | ON | OFF | ON | WWAN | T5D+T4C+T1D+T6C | |
| | ON | ON | OFF | ON | WWAN | T5D+T4C+T1D | ⎭ |

FIG. 5

WLAN 1x1 AND WWAN 2x2 TUNABLE CIRCUIT CONFIGURATION TABLE 602

| Wi-Fi Modes | Antenna Configuration | | | | Tunable Circuit Configuration | |
|---|---|---|---|---|---|---|
| | WLAN Main Antenna | WLAN AUX Antenna | WWAN Main Antenna | WWAN AUX Antenna | Aggressor Signal | Tunable Circuit Combination(s) |
| WLAN 1x1 WWAN 2x2 | ON | OFF | ON | ON | WLAN | T1D+T2C+T5D |
| | ON | OFF | ON | ON | WLAN | T1D+T2C+T3C+T5D |
| | OFF | ON | ON | ON | WLAN | T4D+T5C+T2D |
| | OFF | ON | ON | ON | WLAN | T4D+T5C+T6C+T2D |
| | ON | OFF | ON | ON | WWAN Main | T2D+T5D+T1C |
| | ON | OFF | ON | ON | WWAN Main | T2D+T5D+T1C+T3C |
| | OFF | ON | ON | ON | WWAN Aux | T2D+T5D+T4C |
| | OFF | ON | ON | ON | WWAN Aux | T2D+T5D+T4C+T6C |

604 WLAN SIGNAL CAUSING INTERFERENCE (rows 1-4)
606 WWAN SIGNAL CAUSING INTERFERENCE (rows 5-8)

FIG. 6

WLAN 2x2 AND WWAN 2x2 TUNABLE CIRCUIT CONFIGURATION TABLE 702

| Wi-Fi Modes | Antenna Configuration ||||  Tunable Circuit Configuration ||
|---|---|---|---|---|---|---|
| | WLAN Main Antenna | WLAN AUX Antenna | WWAN Main Antenna | WWAN AUX Antenna | Aggressor Signal | Tunable Circuit Combination(s) |
| WLAN 2x2 WWAN 2x2 | ON | ON | ON | ON | WLAN Main | T1D+T4D+T2C+T5D |
| | ON | ON | ON | ON | WLAN Main | T1D+T4D+T2C+T3C+T5D |
| | ON | ON | ON | ON | WLAN Aux | T1D+T4D+T5C+T2D |
| | ON | ON | ON | ON | WLAN Aux | T1D+T4D+T5C+T6C+T2D |
| | ON | ON | ON | ON | WWAN Main | T2D+T5D+T1C+T4D |
| | ON | ON | ON | ON | WWAN Main | T2D+T5D+T1C+T3C+T4D |
| | ON | ON | ON | ON | WWAN Aux | T2D+T5D+T4C+T1D |
| | ON | ON | ON | ON | WWAN Aux | T2D+T5D+T4C+T6C+T1D |

704 WLAN SIGNAL CAUSING INTERFERENCE

706 WWAN SIGNAL CAUSING INTERFERENCE

METHOD AND APPARATUS FOR OPERATING AN ANTENNA CO-EXISTENCE CONTROLLER

FIELD OF THE DISCLOSURE

The present disclosure generally relates to transceiving cellular and wireless data streams simultaneously via a plurality of antennas in a mobile information handling system. The present disclosure more specifically relates to optimizing the configuration of the wireless data streams transceived based on received trigger inputs indicating occurrence of co-location interference on one or more wireless data streams.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of cellular, Wi-Fi, GPS and Bluetooth signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphical diagram illustrating a first tunable circuit configuration table according to an embodiment of the present disclosure;

FIG. 4 is a graphical diagram illustrating a second tunable circuit configuration table according to an embodiment of the present disclosure;

FIG. 5 is a graphical diagram illustrating a third tunable circuit configuration table according to an embodiment of the present disclosure;

FIG. 6 is a graphical diagram illustrating a third tunable circuit configuration table according to an embodiment of the present disclosure;

FIG. 7 is a graphical diagram illustrating a fourth tunable circuit configuration table according to an embodiment of the present disclosure;

The use of the same reference symbols in different drawings may indicate similar or identical items.

DETAILED DESCRIPTION OF THE DRAWINGS

Figure 1:
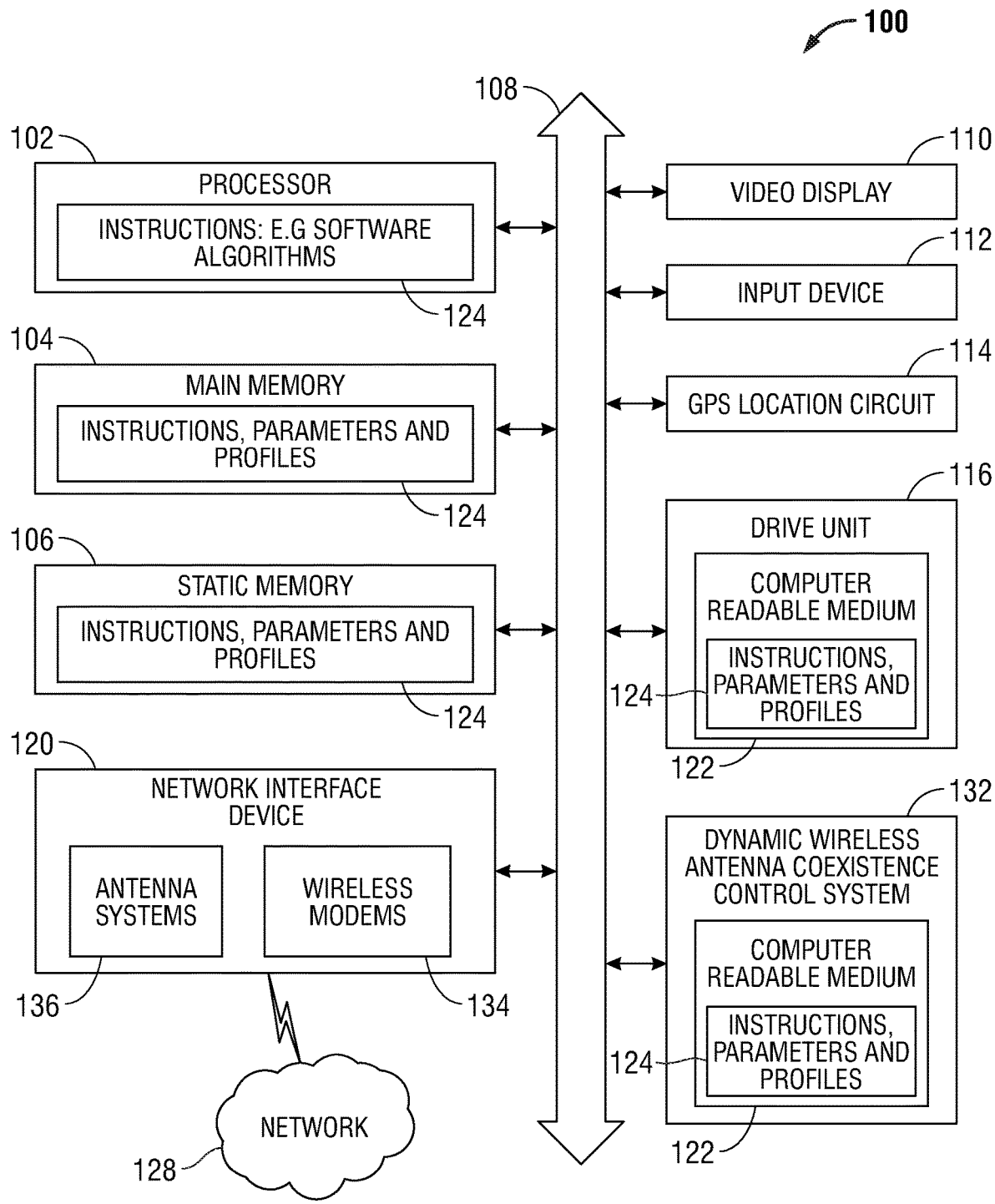
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. For example, mobile information handling systems often simultaneously transceive cellular and Wi-Fi signals, such as both wireless local area network (WLAN) signals and wireless wide area network (WWAN) signals. In example embodiments, a mobile information handling system may transceive WLAN and WWAN signals according to a plurality of antenna configurations, including a WLAN signal from a first array of one (e.g. 1×1 WLAN) or two (e.g. 2×2 WLAN) antennas, and simultaneously transceive a WWAN signal from a separate, second array of one (e.g. 1×1 WWAN) or two (e.g. 2×2 WWAN) antennas. The first array of antennas in an embodiment may include a main WLAN antenna and an auxiliary WLAN antenna, and the second array may include a main WWAN antenna and an auxiliary WWAN antenna. In embodiments, the main WLAN and main WWAN antennas may be situated very close to one another, otherwise known as "collocated," and the auxiliary WLAN and auxiliary WWAN antenna may also be collocated. In an ideal operating state, a WLAN antenna radiates or transfers all power supplied to the WLAN signal into the environment from the WLAN radio and the WWAN antenna radiates or transfers all power supplied to the WWAN signal into the environment from the WWAN radio, thus transmitting the strongest possible WLAN and WWAN signals.

In actual operation, simultaneous transmission of a WLAN signal and reception of a WWAN signal, or vice versa, from collocated antennas may result in unwanted co-location interference on the received signal. Co-location interference may arise due to closely spaced WLAN or WWAN antennas operating in a similar frequency band, for example WLAN 2.4 GHz and WWAN 2.36 GHz LTE B30 transmission or 2.4 GHz LTE B40 TDD. In such a scenario, the transmitting signal may cause resonance or ringing on the received signal, causing the power of the signal as it reaches the receiving antenna to be higher than it was upon transmission. In such a scenario, the excess power of the received signal may cause the signal quality of the received signal to drop below usable levels. The received signal quality may be affected by a decrease in signal to noise ratio (SNR) as indicated by the Received Signal Strength Indicator (RSSI) of the signal, a decrease in throughput, or other measurable signal quality indicator. The terms "usable" or "unusable" as used herein may refer to only an undesirable loss of performance rather than an ability to use the signal at all. An unusable signal is one in which an alternative configuration may yield a performance improvement.

For example, simultaneous transmission of a WLAN signal from the main WLAN antenna and reception of a WWAN signal from the main WWAN antenna may result in collocation interference on the incoming WWAN signal. As another example, simultaneous transmission of a WWAN signal from the main WWAN antenna and reception of a WLAN signal from the auxiliary WLAN antenna may result in collocation interference on the incoming WLAN signal. In some embodiments, the main WLAN and main WWAN antennas may be spaced sufficiently far apart within a form factor casing of the mobile information handling system to ensure neither of the main antenna signals can cause co-location interference on the auxiliary antenna signals, and vice versa.

In order to simultaneously transceive a WLAN signal and a WWAN signal, mobile information handling systems often include one modem or microcontroller chip for generating and processing received WLAN signals and another modem for generating and processing received WWAN signals. These separate modems in embodiments of the present disclosure, as purchased from an upstream vendor and incorporated into the mobile information handling system, may not include capabilities for communicating with one another, or recognizing an occurrence of co-location interference between the signals generated from and/or received by each modem.

Current solutions to this problem involve identifying which of the wireless signals (WLAN or WWAN) is causing the interference to occur on the other signal (referred to as the "aggressor signal"), and to decrease power to the aggressor signal until the interference dissipates. However, decreasing power to the aggressor signal may inadvertently cause the signal strength of that signal to drop below usable levels. A solution is needed to decrease interference between different wireless signals without decreasing the power of the aggressor signal below usable or desirable levels.

Embodiments of the present disclosure address the above issue by providing a dynamic wireless antenna co-existence control system directing operation of a plurality of interference controllers to dynamically alter the impedance of the victim signal affected by the aggressor signal or alter impedance of the aggressor signal together or individually with altering the impedance of the victim signal. Altering the impedance of the victim or aggressor signals individually or in conjunction with one another is done to increase the rejection rather than decreasing power of the aggressor signal, in order to decrease the co-location interference between the signals. A dynamic wireless antenna co-existence control system in embodiments of the present disclosure may receive operating band as well as channel or signal quality measurements for all incoming and outgoing signals of a mobile information handling system either directly from a radio modem module or a host processor relating to the plurality of antennas of the mobile information handling system. In such embodiments, the dynamic wireless antenna co-existence control system may identify when an instance of co-location interference is occurring, identify the aggressor signal causing the interference, and determine a configuration of impedance matching circuit(s) that may condition the incoming signal to remove the deleterious effects of the co-location interference. The dynamic wireless antenna co-existence control system in embodiments may then transmit instructions to one or more interference controllers to route the affected incoming signal through one or more impedance matching circuits in the determined configuration in order to alter the antenna impedance, tuning, or radiation pattern of the aggressor and victim antennas individually or in conjunction to decrease the effects of the co-location interference and increase signal quality of the incoming signal. Tunable impedance matching circuits in embodiments of the present disclosure often employ one or more LC circuits with tunable values for capacitance or inductance.

For example, in embodiments of the present disclosure, the dynamic wireless antenna co-existence control system may route an incoming signal from an antenna through a tunable impedance matching circuit. Tunable impedance matching circuits may be initially set to a universal standard impedance for radio frequency (RF) signal processing of 50 ohms. The interference controllers may also adjust the impedances of these tunable impedance matching circuits based on operational parameters and signal quality measurements for the affected victim and aggressor signals pursuant to the instructions received from the dynamic wireless antenna coexistence control system. For example, an interference controller in an embodiment may alter the impedance via a tunable impedance matching circuit from the default 50 ohm impedance to a different impedance level, such as 30 ohms, to result in improved power transfer and rejection. By altering the impedance tuning or detuning of the tunable impedance matching circuit, the interference controller may alter antenna radiation pattern via impedance tuning or detuning to increase rejection of the incoming signal affected by colocation interference, thus improving the quality of that signal without having to adjust the power of the transmitting signal causing the interference.

In other embodiments, an interference controller may simultaneously pass an incoming signal affected by increased power (e.g. ringing) due to co-location interference and an outgoing signal causing the co-location interference through one or more impedance matching circuits operating as a shunt type couple resonator decoupling network (S-CRDN) connecting the aggressor and victim antenna feed to cancel out the port to port coupling between collocated aggressor and victim antenna feeds with the decoupling network adapted to create an open circuit path between the feeds at the frequency of transmission to further increase rejection to the received signal. For example, if passing the incoming signal affected by co-location interference through the tunable impedance matching circuit described directly above increases the rejection of the signal and improves signal quality, the interference controller may pass the signal from the tunable impedance matching circuit to an S-CRDN to further increase the rejection between the aggressor and victim in conjunction by connecting the aggressor and victim feeds via the shunting de-coupling network. The physical configuration of impedance matching circuits within an S-CRDN in embodiments may be fixed prior to operation of the mobile information handling system, but the interference controllers may be capable of dynamically altering the impedance (e.g. by altering the capacitance or inductance) of each impedance matching circuit within the S-CRDN based on operational parameter and signal quality measurements for the affected and aggressor signals, pursuant to the instructions received from the dynamic wireless antenna co-existence control system.

The interference controllers in embodiments of the present disclosure may be capable of adaptively setting the impedance of each tunable impedance matching circuit. The interference controllers may set the impedance of tunable impedance matching circuits in embodiments pursuant to instructions received from the dynamic wireless antenna co-existence control system. The dynamic wireless antenna co-existence control system in embodiments may determine which instructions to transmit to the interference controllers based on a determination of the current antenna configuration (e.g. 1×1 WLAN, 1×1 WWAN), received indications of co-location interference, received measurements of operational parameters and signal quality and reference to one or more tunable circuit configuration tables.

In embodiments of the present disclosure, one or more tunable circuit configuration tables describing optimal tunable circuit configurations for several operating conditions may be stored in a memory accessible by the dynamic wireless antenna co-existence control system. Tunable circuit configuration table in embodiments of the present disclosure may associate one or more tunable circuit combinations with a given antenna configuration. For example, in an embodiment in which the mobile information handling system is transmitting only a 2×2 WLAN signal, and not transmitting a WWAN signal, the dynamic wireless antenna co-existence control system may access a multiple input multiple output (MIMO) tunable circuit configuration table, to determine the most optimal tunable circuit configuration for that scenario.

The optimal tunable circuit configuration in embodiments may identify one or more tunable impedance matching circuits through which each signal may be routed, and may further describe the impedance to which identified tunable impedance matching circuit should be set. Impedance matching circuits in embodiments of the present disclosure may be set to a default value of 50 ohms. For example, in an embodiment in which the mobile information handling system is transmitting only a 2×2 WLAN signal, and not transmitting a WWAN signal, the optimal tunable circuit configuration may identify two tunable impedance matching circuits through which the two separate WLAN signals should be routed, and may indicate the impedances of each of the identified tunable impedance matching circuits should be set to the default value of 50 ohms. In such example embodiments, the dynamic wireless antenna co-existence control system may then transmit instructions to the interference controllers, which, in response, may then route the WLAN signal to the identified tunable impedance matching circuits and set the impedance of the tunable impedance matching circuits to the default value of 50 ohms. Each tunable impedance matching circuit may then apply the set impedance to the received WLAN signals, thus tuning each antenna and maximizing power transfer from the radio to the antenna.

In embodiments in which no co-location interference is detected (e.g. only WLAN or only WWAN signal(s) being transceived), all tunable impedance matching circuits may be set to the default value of 50 ohms. In other embodiments, in which co-location interference is detected (e.g. WWAN and WLAN signals simultaneously transceived), the dynamic wireless antenna coexistence control system may transmit instructions to one or more interference controllers to alter the impedances of one or more tunable impedance matching circuits according to an optimal tunable circuit configuration in order to increase rejection to victim received signals impacted by the co-location interference. For example, in embodiments where the mobile information handling system antenna configuration includes WLAN 2×2 (WLAN transmitted and/or received from a main WLAN antenna and auxiliary WLAN antenna) and WWAN 1×1 (WWAN transmitted and/or received from a main WWAN antenna), the dynamic wireless antenna coexistence control system may receive an indication of co-site interference caused by a WWAN aggressor signal. An indication of co-site interference caused by a WWAN aggressor signal in embodiments of the present disclosure may include identification of a drop in signal quality and/or a spike in power measurement for the WLAN signal being received on an antenna collocated with the antenna transmitting the WWAN aggressor signal, because these indications may signify signal resonance or ringing effects on the WLAN signal.

The dynamic wireless antenna coexistence control system in such an embodiment may access a WLAN 2×2, WWAN 1×1 tunable circuit configuration table to determine an optimal tunable circuit configuration. The WLAN 2×2, WWAN 1×1 tunable circuit configuration table in such an embodiment may identify an optimal tunable circuit configuration associated with the above described antenna configuration and aggressor signal that includes a tunable impedance matching circuit set to a default impedance of 50 ohms for conditioning of the aggressor WWAN signal, an S-CRDN set to create a high impedance path between the aggressor and victim feeds to remove the ill effects of the colocation interference to the received WLAN signal, and/or a second tunable impedance matching circuit with an impedance altered to further increase rejection to the WLAN signal as it leaves the S-CRDN (e.g. if the S-CRDN cannot increase the rejection to the WLAN signal to remove or decrease the ill effects of the colocation interference). In such embodiments, the optimal tunable circuit configuration may execute instructions received from the dynamic wireless antenna coexistence control system to route the WWAN aggressor signal through the identified tunable impedance matching circuits with default impedance value of 50 ohms, and further route the WWAN aggressor signal through the S-CRDN, set the S-CRDN impedance to be modified at the receive channel of the WLAN signal. In such a way, embodiments of the present disclosure may decrease interference between different wireless signals without decreasing the power of the aggressor signal below usable levels.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the dynamic wireless antenna co-existence control system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input, and a GPS location circuit 114 capable of measuring a geographic location in three-dimensions. The GPS location circuit 114 may also be capable of measuring, a velocity, and an acceleration of a mobile, semi-mobile, and/or stationary information handling system. The information handling system 100 can also include a disk drive unit 116.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. wireless adapter 120 may include one or more wireless modems 134 with transmitter/receiver circuitry, wireless controller circuitry, amplifiers and other circuitry for wireless communications. The wireless adapter 120 may also include antenna system 136 which may be tunable antenna systems for use with the system and methods disclosed herein. The wireless modems 134 may include wireless controllers to manage authentication, connectivity, communications, power levels for transmission, buffering, error correction, baseband processing, and other functions of the wireless adapter 120.

The information handling system 100 can include a set of instructions 124 that can be executed to cause the computer system to perform any one or more of the methods or computer based functions disclosed herein. For example, instructions 124 may execute a dynamic wireless antenna co-existence control system, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the dynamic wireless antenna co-existence control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including one or more tunable circuit configuration tables. The disk drive unit 116 and static memory 106 also contain space for data storage. Further, the instructions 124 may embody one or more of the methods or logic as described herein. For example, instructions relating to the dynamic wireless antenna co-existence control system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the dynamic wireless antenna co-existence control system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The dynamic wireless antenna co-existence control system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a dynamic wireless antenna co-existence control system 132 that may be operably connected to the bus 108. The dynamic wireless antenna co-existence control system 132 computer readable medium 122 may also contain space for data storage. The dynamic wireless antenna co-existence control system 132 may perform tasks related to receiving trigger inputs indicating operating or environmental conditions of the information handling system, determining an optimal tunable circuit configuration for tuning WLAN and/or WWAN signals prior to transmission, and directing one or more interference controllers to route the WLAN and WWAN signals through one or more tunable impedance matching circuits identified within the optimal tunable circuit configuration. The memory 104 may store one or more tunable circuit configuration tables.

In an embodiment, the dynamic wireless antenna co-existence control system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
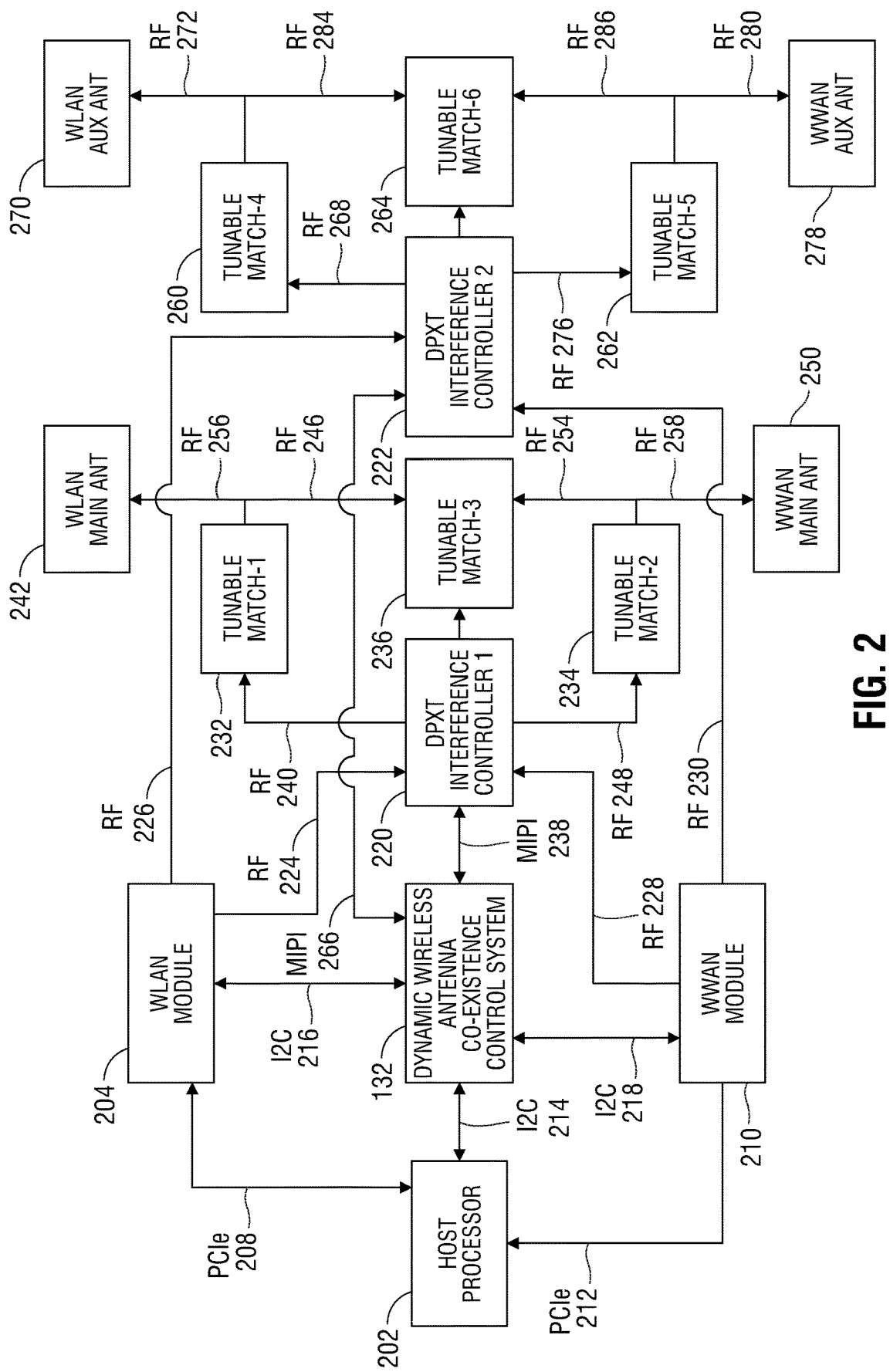
FIG. 2 is a block diagram illustrating a dynamic wireless antenna co-existence control system operating with an information handling system according to an embodiment of the present disclosure.

FIG. 2 is a block diagram illustrating an operation of a dynamic wireless antenna co-existence control system by directing the flow of signals from a WLAN module and a WWAN module to four separate antennas of a mobile information handling system according to an embodiment of the present disclosure. A mobile information handling system in an embodiment may simultaneously transmit multiple types of wireless signals, such as both wireless local area network (WLAN) signals and wireless wide area network (WWAN) signals according to a plurality of antenna configurations, including a WLAN signal from a first array of one (e.g. 1×1 WLAN) or two (e.g. 2×2 WLAN) antennas, and simultaneously transceive a WWAN signal from a separate, second array of one (e.g. 1×1 WWAN) or two (e.g. 2×2 WWAN) antennas. The first array of antenna in an embodiment may include, for example, a main WLAN antenna 242 and an auxiliary WLAN antenna 270, and the second array may include a main WWAN antenna 250 and an auxiliary WWAN antenna 278. The main WLAN antenna 242 and main WWAN antenna 250 in an embodiment may be situated very close to one another, or "collocated" within a form factor casing of a mobile information handling system. Similarly, the auxiliary WLAN antenna 270 and auxiliary WWAN antenna 278 in an embodiment may be situated very close to one another, or "collocated" within a form factor casing of a mobile information handling system. In some embodiments, the main WLAN antenna 242 and main WWAN antenna 250 may be spaced a sufficient distance away from the WLAN auxiliary antenna 270 and WWAN auxiliary antenna 278 such that signals transceived from either main antenna 242 or 250 may not cause colocation interference issues with signals transceived from either auxiliary antenna 270 or 278.

As shown in FIG. 2, the mobile information handling system in an embodiment may transmit a single WLAN signal from either a WLAN main antenna (Ant) 242, or a WLAN auxiliary (Aux) antenna (Ant) 270 according to a WLAN 1×1 operation, or may transmit or receive two WLAN signals, one from the WLAN main antenna 242 and one from the WLAN auxiliary antenna 270 according to a WLAN 2×2 operation. As another example, the mobile information handling system in an embodiment may transmit or receive a single WWAN signal from either a WWAN main antenna (Ant) 250, or a WWAN auxiliary (Aux) antenna (Ant) 278 according to a WWAN 1×1 operation, or may transmit two WWAN signals, one from the WWAN main antenna 250 and one from the WWAN auxiliary antenna 278 according to a WWAN 2×2 operation.

The mobile information handling system in an embodiment may transmit only WLAN signal(s), only WWAN signal(s), or both WLAN and WWAN signal(s) simultaneously. In order to transmit a WLAN signal and receive a WWAN signal, mobile information handling systems often include one modem or microcontroller chip for generating and processing received WLAN signals and another modem for generating and processing received WWAN signals. For example, as shown in FIG. 2, the mobile information handling system in an embodiment may include WLAN module 204, and WWAN module 210.

The WLAN module 204 and the WWAN module 210 in an embodiment may not include capabilities for communicating with one another, or recognizing an occurrence of co-location interference between the signals generated from each module. Co-location interference issues arise when two antennas transceiving near the same operating frequency are placed in close proximity to one another, and the transmission or reception of one of the signals causes extreme interference to the other signal and/or vice versa, such that one or both signals becomes unusable. For example, in an embodiment, co-location interference may arise when the signal transmitted from either or both of the WLAN main antenna 242 and WLAN auxiliary antenna 270 causes interference sufficient to make the signal received by the WWAN main antenna 250 and/or the WWAN auxiliary antenna 278 to become unusable. As another example, in another embodiment, co-location interference may arise when the signal transmitted from either or both of the WWAN main antenna 250 and the WWAN auxiliary antenna 278 causes interference sufficient to make the signal received by the WLAN main antenna 242 and/or WLAN auxiliary antenna 270 to become unusable.

Current solutions to this co-location interference problem involve adding filters at the radio module RF front end, however rejection on these filters are not sufficient to overcome deleterious effects of co-location interference and receiver performance is almost always impacted. An aggressor signal, the wireless signal(s) (WLAN or WWAN) causing the interference to occur on the other signal (referred to as the "victim signal"), may not be identified and power to all signals may be decreased. However, decreasing power to the aggressor signal may inadvertently cause the signal strength of that signal to drop below usable levels. A solution is needed to decrease interference between different wireless signals without decreasing the power of the aggressor signal below usable levels.

The dynamic wireless antenna co-existence control system 132 in an embodiment may address this issue by directing, via control circuitry, the operation of a plurality of interference controllers 220, 222 to dynamically alter the impedance of the received affected signal, rather than decreasing power of the aggressor signal, in order to decrease the co-location interference between the signals without decreasing the signal strength of the aggressor signal. For example in FIG. 2, a dynamic wireless antenna co-existence system 132 may be operably connected to a first interference controller 220 and a second interference controller 222. The dynamic wireless antenna co-existence control system 132 in an embodiment with controller circuitry may transmit instructions directing operation of the first interference controller 220 via MIPI interface 238, and instructions directing operation of the second interference controller via MIPI interface 266.

The interference controllers in embodiments of the present disclosure may route WLAN signals from a WLAN modem or module and WWAN signals from a WWAN modem or module to one or more tunable impedance matching circuits according to a tunable circuit configuration in order to optimize signal quality. For example, the first interference controller 220 may route WLAN signals to or from the WLAN module 204 via radio-frequency (RF) line 224, and/or may route WWAN signals to or from the WWAN module 210 via RF line 228. The second interference controller 222 may route WLAN signals to or from the WLAN module 204 via RF line 226 and/or may route WWAN signals to or from the WWAN module 210 via RF line 230. As another example, the first interference controller 220 may route a WLAN signal to or from a first tunable impedance matching circuit 232 via RF line 240, and/or may route a received WWAN signal to or from a second tunable impedance matching circuit 234 via RF line 248.

The first tunable impedance matching circuit 232 in an embodiment may tune a WLAN signal received from the interference controller 220 via RF line 240 and transmit the tuned WLAN signal to the WLAN main antenna 242 via RF line 256, or may tune a WLAN signal received from the WLAN main antenna 242 via RF line 256 and transmit the tuned WLAN signal to the interference controller 220 via RF line 240. The second tunable impedance matching circuit 234 in an embodiment may tune the WWAN signal received from the interference controller 220 via RF line 248 and transmit the tuned WWAN signal to the WWAN main antenna 250 via RF line 258, or may tune a WWAN signal received from the WWAN main antenna 250 via RF line 258 and transmit the tuned WWAN signal to the interference controller 220 via RF line 248. The third tunable impedance matching circuit 236 in an embodiment may be a plurality of tunable impedance matching circuits operating as an S-CRDN to operably connect or shunt the WLAN signal leaving the first tunable impedance matching circuit 232 via RF line 246 to the third tunable impedance matching circuit 236. By shunting the WLAN signals in such a way, the third tunable impedance matching circuit 236 in such an embodiment may increase rejection to the WWAN receiving antenna operating at a similar frequency to the WLAN. For example, if the WLAN main antenna is transmitting a WLAN signal that is causing co-location interference on a WWAN signal being received by the WWAN main antenna, the shunting between the transmitting WLAN signal via RF line 246 through S-CRDN 236, received WWAN signal via RF line 254 may remove any co-location interference ringing effects on the received WWAN signal, as described in greater detail herein.

In another embodiment, the third tunable impedance matching circuit 236 in an embodiment may be a plurality of tunable impedance matching circuits operating as an S-CRDN to operably connect or shunt the WWAN signal leaving the first tunable impedance matching circuit 234 via RF line 254 to the third tunable impedance matching circuit 236. By shunting the WWAN in such a way, the third tunable impedance matching circuit 236 in such an embodiment may increase rejection to the WLAN receiving antenna operating at similar or same frequency as WWAN. For example, if the WWAN main antenna is transmitting a WWAN signal that is causing co-location interference on a WLAN signal being received by the WLAN main antenna, the shunting between the transmitting WWAN signal via RF line may remove any co-location interference ringing effects on the received WLAN signal, as described in greater detail herein. It is understood the transmitter and receiver may be switched between WLAN and WWAN and operate similarly to increase rejection to the receiving feed.

The second interference controller 222 in an embodiment may route a WLAN signal to or from a fourth tunable impedance matching circuit 260 via RF line 268, and/or may route a WWAN signal to or from a fifth tunable impedance matching circuit 262 via RF line 276. The fourth tunable impedance matching circuit 260 in an embodiment may tune a WLAN signal received from the interference controller 222 via RF line 268 and transmit the tuned WLAN signal to the WLAN auxiliary antenna 270 via RF line 272, or may tune a WLAN signal received from the WLAN auxiliary antenna 270 via RF line 272 and transmit the tuned WLAN signal to the interference controller 222 via RF line 268. The fifth tunable impedance matching circuit 262 in an embodiment may tune a WWAN signal received from the interference controller 222 via RF line 276 and transmit the tuned WWAN signal to the WWAN auxiliary antenna 278 via RF line 280, or may tune a WWAN signal received from the WWAN auxiliary antenna 278 via RF line 280 and transmit the tuned WWAN signal to the interference controller 222 via RF line 276. The sixth tunable impedance matching circuit 264 in an embodiment may be a plurality of tunable impedance matching circuits operating as an S-CRDN to operably connect or shunt the WLAN signal leaving the fourth tunable impedance matching circuit 260 via RF line 284 to the sixth tunable impedance matching circuit 264. By shunting the WLAN feed in such a way, the sixth tunable impedance matching circuit 264 in such an embodiment may increase rejection to the WWAN receiving antenna operating at the same or similar frequency as the WLAN antenna. For example, if the WWAN auxiliary antenna 278 is transmitting a WWAN signal that is causing co-location interference on a WLAN signal being received by the WLAN auxiliary antenna 270, the shunting between the transmitting WWAN signal via RF line 280 and the received WLAN signal via RF line 272 through S-CRDN 264 may remove any co-location interference ringing effects on the received WLAN signal, as described in greater detail herein.

Each of the first through sixth tunable impedance matching circuits (e.g., 232, 234, 236, 260, 262, and 264) in an embodiment may tune or alter the impedance of the received WLAN or WWAN signal, and that impedance matching or tuning may be dependent upon an adaptable impedance value. First and second interference controllers 220, 222 in an embodiment may be capable of dynamically setting the impedance of each tunable impedance matching circuit. The interference controllers 220 and 222 in an embodiment may set the impedance of tunable impedance matching circuits 232, 234, 236, 260, 262, and 264 pursuant to instructions received from the dynamic wireless antenna co-existence control system 132 via MIPI interface 238 or MIPI interface 266, respectively.

The dynamic wireless antenna co-existence control system 132 operating with a mobile information handling system in an embodiment may determine which instructions to transmit to the interference controllers based on a determination of the current antenna configuration, received indications of co-location interference (if any), measured values of signal quality and/or operating parameters for each transceiving signal such as band, channel, MCS, error rate, SNR, RSSI, TX/RX state, device usage modes or other factors, and reference to one or more tunable circuit configuration tables stored in memory (not shown) of the mobile information handling system. The dynamic wireless antenna co-existence control system 132 of the mobile information handling system in an embodiment may receive identification of the current antenna configuration, indications of co-location interference (if any) and identification of either the WLAN signal(s) or WWAN signal(s) as the aggressor or transmitting signal causing the interference from the host processor 202 via an I2C or general protocol input/output (GPIO) line 214, and may receive measured values of signal quality and/or operating parameters for each transceiving signal from the host processor 202 via I2C or GPIO line 214, or from either or both of the WLAN module 204 via I2C 216 and WWAN module 210 via I2C 218. A host processor 202 may receive measured values of signal quality or other operating parameter feedback including TX/RX state information from WLAN module 204 via PCIe bus 208 and from WWAN module 210 via PCIe bus 212 in other embodiments. Then the host processor 202 may provide the data via I2C or GPIO 214 to the dynamic wireless antenna co-existence control system 132 of the mobile information handling system as described in embodiments herein.

The host processor 202 in an embodiment may further instruct the transmission of WLAN signal(s) and WWAN signal(s) according to an antenna configuration. For example, the host processor 202 in an embodiment may instruct the WLAN module 204 to send a single WLAN signal to either the first interference controller 220 via RF line 224 or to the second interference controller 222 via RF line 226, in accordance with a single input single output (SISO) WLAN 1×1 operation. As another example, the host processor 202 in an embodiment may instruct the WLAN module 204 to send a first WLAN signal to the first interference controller 220 via RF line 224 and to send a second WLAN signal to the second interference controller 222 via RF line 226, in accordance with a multiple input multiple output (MIMO) WLAN 2×2 operation. As another example, the host processor 202 in an embodiment may instruct the WWAN module 210 to send a single WWAN signal to either the first interference controller 220 via RF line 228 or to the second interference controller 222 via RF line 230, in accordance with a SISO WWAN 1×1 operation. As yet another example, the host processor 202 in an embodiment may instruct the WWAN module 210 to send a first WWAN signal to the first interference controller 220 via RF line 228 and to send a second WWAN signal to the second interference controller 222 via RF line 230, in accordance with a MIMO WWAN 2×2 operation.

FIG. 3 is a graphical diagram illustrating a first tunable circuit configuration table for a wireless operation in which only WLAN signals or only WWAN signals are being transceived according to an embodiment of the present disclosure. In embodiments where only a WLAN signal or only a WWAN signal is being transceived, co-location interference between WLAN and WWAN signals may not be present. The dynamic wireless antenna co-existence control system in an embodiment may transmit instructions to the interference controllers, which, in response, may route the WLAN and WWAN signals to tunable impedance matching circuits according to an optimal tunable circuit configuration. The optimal tunable circuit configuration in an embodiment may describe which tunable impedance matching circuits each wireless signal should be routed through and the impedances to which each of the tunable impedance matching circuits may be set in order to maximize the quality of each signal. The dynamic wireless antenna co-existence control system in an embodiment may identify the optimal tunable circuit configuration by reference to one or more tunable circuit configuration tables describing optimal tunable circuit configurations for several operating conditions. Tunable circuit configuration tables in embodiments of the present disclosure may associate one or more tunable circuit combinations with a given antenna configuration.

In some embodiments, a single tunable circuit configuration table may describe the optimal tunable circuit configuration for each possible combination of antenna configuration and detected aggressor signal. In other embodiments, and as described herein, multiple tunable circuit configuration tables may be accessed, with each tunable circuit configuration table describing a different operation. For example, a first tunable circuit configuration table may describe a wireless operation in which only WLAN or only WWAN is being transceived (e.g. WLAN 1×1 or WWAN 1×1), a second tunable circuit configuration table may describe a wireless operation in which a single WLAN signal and a single WWAN signal are being transceived (e.g. WLAN 1×1 and WWAN 1×1), a third tunable circuit configuration table may describe a wireless operation in which two WLAN signals and a single WWAN signal are being transceived (e.g. WLAN 2×2 and WWAN 1×1), a fourth tunable circuit configuration table may describe a wireless operation in which a single WLAN signal and two WWAN signals are being transceived (e.g. WLAN 1×1 and WWAN 2×2), and a fifth tunable circuit configuration table may describe a wireless operation in which two WLAN signals and two WWAN signals are being transceived (e.g. WLAN 2×2 and WWAN 2×2).

For example, as shown in FIG. 3, in an embodiment in which the mobile information handling system is transmitting only a WLAN signal, and not transmitting a WWAN signal, the dynamic wireless antenna co-existence control system may access the single signal type transmission tunable circuit configuration table 302, to determine the most optimal tunable circuit configuration for that scenario. The single signal type transmission tunable circuit configuration table 302 in an embodiment may associate each of a plurality of SISO antenna configurations with an optimal tunable circuit configuration. For example, as shown in the top row of the group of rows 304, the single signal type transmission tunable circuit configuration table 302 in an embodiment may associate a WLAN 1×1 operation in which the single WLAN signal is transceived via the WLAN main antenna with an optimal tunable circuit configuration "T1D." Identification of tunable circuits, as described with reference to any tunable circuit configuration table herein may refer to the tunable circuits described above with reference to FIG. 2. For example, identification of "T1" within FIGS. 3-7 may refer back to the first tunable impedance matching circuit 232 of FIG. 2, identification of "T2" within FIGS. 3-7 may refer back to the second tunable impedance matching circuit 234 of FIG. 2, identification of "T3" within FIGS. 3-7 may refer back to the third tunable impedance matching circuit 236 of FIG. 2, identification of "T4" within FIGS. 3-7 may refer back to the fourth tunable impedance matching circuit 260 of FIG. 2, identification of "T5" within FIGS. 3-7 may refer back to the fifth tunable impedance matching circuit 262 of FIG. 2, and identification of "T6" within FIGS. 3-7 may refer back to the sixth tunable impedance matching circuit 264 of FIG. 2.

Returning to FIG. 3, the "T1D" identification, as shown in the top row of the group of rows 304, may denote the most optimal tunable circuit configuration in which a single WLAN signal is being transceived from the WLAN main antenna and no WWAN signal is being transceived involves routing the single WLAN signal through the first tunable impedance matching circuit (T1) with a default impedance ("D") of 50 ohms. As another example, as shown in the bottom row of the group of rows 304, the single signal type transmission tunable circuit configuration table 302 in an embodiment may associate a WLAN 1×1 operation in which the single WLAN signal is transceived via the WLAN auxiliary antenna with an optimal tunable circuit configuration "T4D." The "T4D" identification may denote the most optimal tunable circuit configuration in which a single WLAN signal is being transceived from the WLAN auxiliary antenna and no WWAN signal is being transceived involves routing the single WLAN signal through the fourth tunable impedance matching circuit (T4) with an impedance set to a default impedance ("D") of 50 ohms.

As another example, as shown in the top row of the group of rows 306, the single signal type transmission tunable circuit configuration table 302 in an embodiment may associate a WWAN 1×1 operation in which the single WWAN signal is transceived via the WWAN main antenna with an optimal tunable circuit configuration "T2D." The "T2D" identification may denote the most optimal tunable circuit configuration in which a single WWAN signal is being transceived from the WWAN main antenna and no WLAN signal is being transceived involves routing the single WWAN signal through the second tunable impedance matching circuit (T2) with an impedance set to a default impedance ("D") of 50 ohms. As another example, as shown in the bottom row of the group of rows 306, the single signal type transmission tunable circuit configuration table 302 in an embodiment may associate a WWAN 1×1 operation in which the single WWAN signal is transceived via the WWAN auxiliary antenna with an optimal tunable circuit configuration "T5D." The "T5D" identification may denote the most optimal tunable circuit configuration in which a single WWAN signal is being transceived from the WWAN auxiliary antenna and no WLAN signal is being transceived involves routing the single WWAN signal through the fifth tunable impedance matching circuit (T5) with an impedance set to a default impedance ("D") of 50 ohms.

As shown in row 308, the single signal type transmission tunable circuit configuration table 302 in an embodiment may associate a WLAN 2×2 operation in which a first WLAN signal is transceived via the WLAN main antenna and a second WLAN signal is transceived via the WLAN auxiliary antenna with an optimal tunable circuit configuration "T1D+T4D." The "T1D+T4D" identification may denote the most optimal tunable circuit configuration in which a first WLAN signal is being transceived from the WLAN main antenna, a second WLAN signal is being transceived from the WLAN auxiliary antenna, and no WWAN signal is being transceived involves routing the first WLAN signal through the first tunable impedance matching circuit (T1) and the second WLAN signal through the fourth tunable impedance matching circuit (T4), both the first and fourth circuits having an impedance set to a default impedance ("D") of 50 ohms As yet another example, as shown in row 310, the single signal type transmission tunable circuit configuration table 302 in an embodiment may associate a WWAN 2×2 operation in which a first WWAN signal is transceived via the WWAN main antenna and a second WWAN signal is transceived via the WWAN auxiliary antenna with an optimal tunable circuit configuration "T2D+T5D." The "T2D+T5D" identification may denote the most optimal tunable circuit configuration in which a first WWAN signal is being transceived from the WWAN main antenna, a second WWAN signal is being transceived from the WWAN auxiliary antenna, and no WLAN signal is being transceived involves routing the first WWAN signal through the second tunable impedance matching circuit (T2) and the second WWAN signal through the fifth tunable impedance matching circuit (T5), both the second and fifth circuits having an impedance set to a default impedance ("D") of 50 ohms FIG. 4 is a graphical diagram illustrating a second tunable circuit configuration table for operations in which a single WLAN signal and a single WWAN signal are being transceived according to an embodiment of the present disclosure. In embodiments in which a WLAN signal is being transmitted from a first antenna co-located with a second antenna that is receiving a WWAN signal, and both signals are operating in similar frequency ranges, co-location issues may arise. Similarly, in embodiments in which a WWAN signal is being transmitted from a first antenna co-located with a second antenna that is receiving a WLAN signal, and both signals are operating in similar frequency ranges, co-location issues may also arise.

For example, a first array of antennas in an embodiment may include a main WLAN antenna and an auxiliary WLAN antenna, and a second array may include a main WWAN antenna and an auxiliary WWAN antenna. In embodiments, the main WLAN and main WWAN antennas may be situated very close to one another, otherwise known as "collocated," and the auxiliary WLAN and auxiliary WWAN antenna may also be collocated. In actual operation, simultaneous transmission of a WLAN signal and reception of a WWAN signal, or vice versa, from collocated antennas may result in unwanted co-location interference on the received signal. Co-location interference may arise due to closely spaced WLAN or WWAN antennas operating in a similar frequency band, for example WLAN 2.4 GHz and WWAN 2.36 GHz. In such a scenario, the transmitting signal may cause resonance or ringing on the received signal, causing the power of the signal as it reaches the receiving antenna to be higher than it was upon transmission. In such a scenario, the excess power of the received signal may cause the signal quality of the received signal to drop below usable levels. The received signal quality may be affected by a decrease in signal to noise ratio (SNR) as indicated by the RSSI value of the signal, a decrease in throughput, or other measurable signal quality indicator. The terms "usable" or "unusable" as used herein may refer to only an undesirable loss of performance rather than an ability to use the signal at all. An unusable signal is one in which an alternative configuration may yield a performance improvement.

For example, simultaneous transmission of a WLAN signal from the main WLAN antenna and reception of a WWAN signal from the main WWAN antenna may result in collocation interference on the incoming WWAN signal. As another example, simultaneous transmission of a WWAN signal from the auxiliary WWAN antenna and reception of a WLAN signal from the auxiliary WLAN antenna may result in collocation interference on the incoming WLAN signal. In some embodiments, the main WLAN and main WWAN antennas may be spaced sufficiently far apart within a form factor casing of the mobile information handling system to ensure neither of the main antenna signals can cause co-location interference on the auxiliary antenna signals, and vice versa. Current solutions to this problem involve identifying which of the wireless signals (WLAN or WWAN) is causing the interference to occur on the other signal (referred to as the "aggressor signal"), and to decrease power to the aggressor signal until the interference dissipates. However, decreasing power to the aggressor signal may inadvertently cause the signal strength of that signal to drop below usable levels.

Embodiments of the present disclosure address the above issue by providing a dynamic wireless antenna co-existence control system directing operation of a plurality of interference controllers to adaptively alter the impedance of the received victim signal affected by the aggressor signal, rather than decreasing power of the aggressor signal, in order to decrease the co-location interference between the signals without decreasing the signal strength of the aggressor signal. A dynamic wireless antenna co-existence control system in embodiments of the present disclosure may determine an optimal configuration of impedance matching circuit(s) that may condition the incoming signal to remove the deleterious effects of the co-location interference. An interference controller in an embodiment may then execute instructions of the dynamic wireless antenna co-existence control system to route the incoming and outgoing signals through one or more tunable impedance matching circuits identified within the optimal configuration, and set the impedances for each of these tunable impedance matching circuits according to the determined optimal configuration.

An optimal configuration may include routing the affected signal through one or more tunable impedance matching circuits to condition the signal to remove the ill effects of the detected co-location interference. For example, the optimal configuration in an embodiment may route an affected incoming signal from an antenna through a tunable impedance matching circuit. Tunable impedance matching circuits may be initially set to an universal standard impedance for radio frequency (RF) signal processing of 50 ohms. The optimal configuration may involve adjusting the impedances of these tunable impedance matching circuits based on operational parameter and signal quality measurements for the affected and aggressor signals pursuant to the instructions received from the dynamic wireless antenna coexistence control system. For example, an interference controller in an embodiment may drop the impedance of such a tunable impedance matching circuit from the default 50 ohm impedance to a different impedance level, such as 30 ohms, to result in improved power transfer and rejection. Optimal configurations describing an adjusted impedance of a tunable impedance matching circuit within a tunable circuit configuration table in an embodiment may identify the tunable circuit to adjust (e.g. T1 for the first tunable circuit), and may denote an adjusted impedance with the letter "C" following the tunable circuit to adjust (e.g. T1C). In contrast, optimal configurations describing a tunable impedance matching circuit operating at the default 50 ohm value may identify the tunable circuit operating at the default value (e.g. T2 for the second tunable circuit), and may denote the default impedance with the letter "D" (e.g. T2D).

In other embodiments, an optimal configuration may involve also passing an incoming signal affected by increased power (e.g. ringing) due to co-location interference and an outgoing signal causing the co-location interference through one or more impedance matching circuits operating as a shunt type couple resonator decoupling network (S-CRDN) to cancel out the ringing effects on the incoming signal. For example, if passing the incoming signal affected by co-location interference through the tunable impedance matching circuit described directly above fails to increase rejection and improve signal quality, the optimal configuration may involve routing the signal to an S-CRDN to further increase rejection before the victim signal is transmitted to the modem that will process the signal. The physical configuration of impedance matching circuits within an S-CRDN in embodiments may be fixed prior to operation of the mobile information handling system, but the interference controllers may be capable of dynamically altering the impedance (e.g. by altering the capacitance, inductance, and/or resistance) of each impedance matching circuit within the S-CRDN based on operational parameter and signal quality measurements for the affected and aggressor signals, pursuant to the instructions received from the dynamic wireless antenna co-existence control system. As an example, an interference controller in an embodiment may set the impedance of a tunable impedance matching circuit operating as an S-CRDN so as to cancel out or minimize the imaginary component of the trans-admittance (reactive near field coupling) between affected (victim and aggressor) antenna ports. Optimal configurations describing an adjusted impedance of an S-CRDN within a tunable circuit configuration table in an embodiment may identify the S-CRDN to adjust (e.g. T3 for the third tunable circuit), and may denote an adjusted impedance with the letter "C" following the tunable circuit to adjust (e.g. T3C).

The dynamic wireless antenna coexistence control system in an embodiment may identify the optimal tunable circuit configuration through reference to a tunable circuit configuration table stored in memory. As described above, in some embodiments, a single tunable circuit configuration table may describe the optimal tunable circuit configuration for each possible combination of antenna configuration and detected aggressor signal. In other embodiments, and as described herein, multiple tunable circuit configuration tables may be accessed, with each tunable circuit configuration table describing a different operation. For example, in embodiments in which a single WLAN signal and a single WWAN signal are being transceived, a second tunable circuit configuration table may associate one or more optimal tunable circuit configurations with every possible combination of antenna configurations and aggressor signals for that operation. The dynamic wireless antenna coexistence control system in such an embodiment may identify an optimal tunable circuit configuration for the combination of the current wireless operation, current antenna configuration, and detected aggressor signal, and direct the tunable impedance matching circuits of the mobile information handling system to operate according to the identified optimal tunable circuit configuration. In such a way, the dynamic wireless antenna coexistence control system in an embodiment may increase rejection (e.g. remove the co-location interference caused by the aggressor signal) while simultaneously transmitting both a useable WLAN signal and a useable WWAN signal.

The dynamic wireless antenna coexistence control system in an embodiment may receive an indication of co-location interference occurring between simultaneously transceived WLAN and WWAN signals. The indication of co-location interference in such embodiments may also identify which of the WLAN or WWAN signals is causing the co-location interference, and identify that signal as the "aggressor signal." In response to receiving the indication of co-location interference in embodiments of the present disclosure, the dynamic wireless antenna coexistence control system may access one of the tunable circuit configuration tables stored in memory to determine the optimal tunable circuit configuration for minimizing the identified co-location interference. For example, the WLAN 1×1 and WWAN 1×1 tunable circuit configuration table 402 in an embodiment may identify one or more optimal tunable circuit configurations for minimizing co-location interference for each of a plurality of combinations of varying antenna configurations that could result in co-location interference and aggressor signals when the mobile information handling system is operating in a WLAN 1×1 and WWAN 1×1 operation. As described above, co-location interference may occur in embodiments in which both the WLAN main antenna and WWAN main antenna are transceiving, and in which both the WLAN auxiliary antenna and WWAN auxiliary antenna are transceiving.

The mobile information handling system in an example embodiment may transmit and/or receive one WLAN signal from the WLAN main antenna and transmit and/or receive one WWAN signal from the WWAN main antenna pursuant to a WLAN 1×1 and WWAN 1×1 operation. In such an embodiment, if the dynamic wireless antenna coexistence control system receives an indication of co-site interference caused by a WLAN aggressor signal transmitting from the WWAN main antenna, the dynamic wireless antenna coexistence control system may refer to the top row of the group of rows 404 in the WLAN 1×1 and WWAN 1×1 tunable circuit configuration table 402 to identify the tunable circuit configuration "T1D+T2C" as the optimal configuration for minimizing the identified co-location interference. Identification of tunable circuits, as described with reference to the tunable circuit configuration table of FIG. 4 may refer to the tunable circuits described above with reference to FIG. 2. The "T1D+T2C" identification may denote the most optimal tunable circuit configuration involves routing the transmitting aggressor WLAN signal through the first tunable impedance matching circuit (T1) with an impedance set to the default, and routing the received affected WWAN signal through the second tunable impedance matching circuit (T2) with an impedance altered to result in improved power transfer and rejection, thus decreasing the effects of co-location interference from the transmitting WLAN aggressor signal.

Alternatively, in an embodiment in which the mobile information handling system is transmitting one WLAN signal from the WLAN main antenna and receiving one WWAN signal from the WWAN main antenna, the dynamic wireless antenna coexistence control system may refer to the second row of the group of rows 404 in the WLAN 1×1 and WWAN 1×1 tunable circuit configuration table 402 to identify the tunable circuit configuration "T1D+T2C+T3C" as the optimal configuration for minimizing the identified co-location interference. The "T1D+T2C+T3C" identification may denote the most optimal tunable circuit configuration involves routing the transmitting aggressor WLAN signal through the first tunable impedance matching circuit (T1) with an impedance set to the default, routing the received affected WWAN signal through the second tunable impedance matching circuit (T2) with an impedance altered to result in improved power transfer and rejection, and further shunting both the transmitting aggressor WLAN signal and the received affected WWAN signal through the third tunable impedance matching circuit (T3) operating as an S-CRDN with an impedance set so as to cancel out or minimize the imaginary component of the trans-admittance between affected antenna ports. By directing the first, second, and third tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

The dynamic wireless antenna coexistence control system in an embodiment may identify the tunable circuit configuration given in the first row of the set of rows 404 or the tunable circuit configuration given in the second row of the set of rows 404 when the mobile information handling system is transmitting a single WLAN signal from the WLAN main antenna and a single WWAN signal from the WWAN main antenna, and the WWAN signal causes co-location interference on the WLAN signal. The difference between these two configurations is the number of tunable impedance matching circuits through which the affected signal will be routed in order to eliminate the co-location interference. Passing the affected signal through more than one tunable impedance matching circuits may decrease the co-location interference more than passing it through only a single tunable impedance matching circuit, but may also require more battery power to operate multiple tunable impedance matching circuits simultaneously. In some embodiments, the dynamic wireless antenna coexistence control system may initially attempt to eliminate the co-location interference using the lowest number of tunable impedance matching circuits and may only move to a configuration employing a plurality of tunable impedance matching circuits where routing the affected signal through only a single tunable impedance matching circuit does not eliminate or lessen the co-location interference below manageable levels.

In another embodiment, the mobile information handling system in an example embodiment may transmit one WLAN signal from the WLAN auxiliary antenna and receive one WWAN signal from the WWAN auxiliary antenna pursuant to a WLAN 1×1 and WWAN 1×1 operation. In such an embodiment, if the dynamic wireless antenna coexistence control system receives an indication of co-site interference caused by a WLAN aggressor signal, the dynamic wireless antenna coexistence control system may refer to the third row of the group of rows 404 in the WLAN 1×1 and WWAN 1×1 tunable circuit configuration table 402 to identify the tunable circuit configuration "T4D+T5C" as the optimal configuration for minimizing the identified co-location interference. The "T4D+T5C" identification may denote the most optimal tunable circuit configuration involves routing the transmitting aggressor WLAN signal through the fourth tunable impedance matching circuit (T4) with an impedance set to the default, and routing the received affected WWAN signal through the fifth tunable impedance matching circuit (T5) with an impedance altered to result in improved power transfer and rejection, thus decreasing the effects of co-location interference from the transmitting WLAN aggressor signal. By directing the fourth and fifth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

In another aspect, in an embodiment in which the mobile information handling system is transmitting one WLAN signal from the WLAN auxiliary antenna and one WWAN signal from the WWAN auxiliary antenna, the dynamic wireless antenna coexistence control system may refer to the fourth row of the group of rows 404 in the WLAN 1×1 and WWAN 1×1 tunable circuit configuration table 402 to identify the tunable circuit configuration "T4D+T5C+T6C" as the optimal configuration for minimizing the identified co-location interference. The difference between the configuration described in the third and fourth rows of the group of rows 404 is the number of tunable impedance matching circuits through which the aggressor signal will be routed in order to eliminate the co-location interference.

The "T4D+T5C+T6C" identification may denote the most optimal tunable circuit configuration involves routing the transmitting aggressor WLAN signal through the fourth tunable impedance matching circuit (T4) with an impedance set to the default, routing the received affected WWAN signal through the fifth tunable impedance matching circuit (T5) with an impedance altered to result in improved power transfer and rejection, thus decreasing the effects of co-location interference from the transmitting WLAN aggressor signal, and further shunting both the transmitting aggressor WLAN signal and the received affected WWAN signal through the sixth tunable impedance matching circuit (T6) operating as an S-CRDN with an impedance set so as to cancel out or minimize the imaginary component of the trans-admittance between affected antenna ports. By directing the fourth, fifth, and sixth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

In another embodiment, the mobile information handling system may transmit one WWAN signal from the WWAN main antenna and receive one WLAN signal from the WLAN main antenna pursuant to a WLAN 1×1 and WWAN 1×1 operation, and the dynamic wireless antenna coexistence control system may receive an indication of co-site interference caused by a WWAN aggressor signal. In such an embodiment, the dynamic wireless antenna coexistence control system may refer to the first row of the group of rows 406 in the WLAN 1×1 and WWAN 1×1 tunable circuit configuration table 402 to identify the tunable circuit configuration "T1C+T2D" as the optimal configuration for minimizing the identified co-location interference. The "T1C+T2D" identification may denote the most optimal tunable circuit configuration involves routing the transmitting aggressor WWAN signal through the second tunable impedance matching circuit (T2) with an impedance set to the default, and routing the received affected WLAN signal through the first tunable impedance matching circuit (T1) with an impedance altered to result in improved power transfer and rejection, thus decreasing the effects of co-location interference from the transmitting WWAN aggressor signal. By directing the first and second tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

The difference between the configuration described in the group of rows 404 and the group of rows 406 is the identification of the aggressor signal. For example, both the first row of the group of rows 404 and the first row of the group of rows 406 describe the same antenna configuration in which the WLAN main antenna is transmitting a WLAN signal, the WWAN main antenna is transmitting a WWAN signal, and both auxiliary antennas are off. The only difference between the first row of the group of rows 404 and the first row of the group of rows 406 is that the optimal tunable circuit configuration of the first row of the group of rows 404 addresses co-location interference caused by a WLAN aggressor signal, while the optimal tunable circuit configuration of the first row of the group of rows 406 addresses co-location interference caused by a WWAN aggressor signal.

Alternatively, in an embodiment in which the mobile information handling system is transmitting one WLAN signal from the WLAN main antenna and one WWAN signal from the WWAN main antenna, and the dynamic wireless antenna coexistence control system receives an indication of co-site interference caused by a WWAN aggressor signal the dynamic wireless antenna coexistence control system may refer to the second row of the group of rows 406 in the WLAN 1×1 and WWAN 1×1 tunable circuit configuration table 402. The dynamic wireless antenna coexistence control system in such an embodiment may identify the tunable circuit configuration "T1C+T3C+T2D" as the optimal configuration for minimizing the identified co-location interference. The difference between the configuration described in the first and second rows of the group of rows 406 is the number of tunable impedance matching circuits through which the aggressor signal will be routed in order to eliminate the co-location interference.

The "T1C+T3C+T2D" identification may denote the most optimal tunable circuit configuration involves routing the transmitting aggressor WWAN signal through the second tunable impedance matching circuit (T2) with an impedance set to the default, routing the received affected WLAN signal through the first tunable impedance matching circuit (T1) with an impedance altered to result in improved power transfer and rejection, thus decreasing the effects of co-location interference from the transmitting WWAN aggressor signal, and further shunting both the transmitting aggressor WWAN signal and the received affected WLAN signal through the third tunable impedance matching circuit (T3) operating as an S-CRDN with an impedance set so as to cancel out or minimize the imaginary component of the trans-admittance between affected antenna ports. By directing the first, second, and third tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

In another example embodiment, the mobile information handling system may transmit one WWAN signal from the WWAN auxiliary antenna and receive one WLAN signal from the WLAN auxiliary antenna pursuant to a WLAN 1×1 and WWAN 1×1 operation, and the dynamic wireless antenna coexistence control system may receive an indication of co-site interference caused by a WWAN aggressor signal. In such an embodiment, the dynamic wireless antenna coexistence control system may refer to the third row of the group of rows 406 in the WLAN 1×1 and WWAN 1×1 tunable circuit configuration table 402 to identify the tunable circuit configuration "T4C+T5D" as the optimal configuration for minimizing the identified co-location interference. The "T4C+T5D" identification may denote the most optimal tunable circuit configuration involves routing the transmitting aggressor WWAN signal through the fifth tunable impedance matching circuit (T5) with an impedance set to the default, and routing the received affected WLAN signal through the fourth tunable impedance matching circuit (T4) with an impedance altered to result in improved power transfer and rejection, thus decreasing the effects of co-location interference from the transmitting WWAN aggressor signal. By directing the fourth and fifth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

In another aspect, in an embodiment in which the mobile information handling system is transmitting one WWAN signal from the WWAN auxiliary antenna and receiving one WLAN signal from the WLAN auxiliary antenna, and the dynamic wireless antenna coexistence control system receives an indication of co-site interference caused by a WWAN aggressor signal the dynamic wireless antenna coexistence control system may refer to the fourth row of the group of rows 406 in the WLAN 1×1 and WWAN 1×1 tunable circuit configuration table 402. The dynamic wireless antenna coexistence control system in such an embodiment may identify the tunable circuit configuration "T4C+T6C+T5D" as the optimal configuration for minimizing the identified co-location interference. The difference between the configuration described in the third and fourth rows of the group of rows 406 is the number of tunable impedance matching circuits through which the aggressor signal will be routed in order to eliminate the co-location interference.

The "T4C+T6C+T5D" identification may denote the most optimal tunable circuit configuration involves routing the transmitting aggressor WWAN signal through the fifth tunable impedance matching circuit (T5) with an impedance set to the default, routing the received affected WLAN signal through the fourth tunable impedance matching circuit (T4) with an impedance altered to result in improved power transfer and rejection, thus decreasing the effects of co-location interference from the transmitting WWAN aggressor signal, and further shunting both the transmitting aggressor WWAN signal and the received affected WLAN signal through the sixth tunable impedance matching circuit (T6) operating as an S-CRDN with an impedance set so as to cancel out or minimize the imaginary component of the trans-admittance between affected antenna ports. By directing the fourth, fifth, and sixth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

FIG. 5 is a graphical diagram illustrating a third tunable circuit configuration table for operations in which two WLAN signals and a single WWAN signal are being transceived according to an embodiment of the present disclosure. The dynamic wireless antenna coexistence control system in an embodiment, upon receiving an indication of co-location interference, may identify an optimal tunable circuit configuration that includes one or more tunable impedance matching circuits through which the received, affected signal and/or the transmitted, aggressor signal may be routed. The dynamic wireless antenna coexistence control system in such an embodiment may identify the optimal tunable circuit configuration through reference to a tunable circuit configuration table stored in memory.

In an embodiment, multiple tunable circuit configuration tables may be accessed, with each tunable circuit configuration table describing a different operation. For example, in embodiments in which two WLAN signals and a single WWAN signal are being transceived, a third tunable circuit configuration table may associate one or more optimal tunable circuit configurations with every possible combination of antenna configurations and aggressor signals for that operation. The dynamic wireless antenna coexistence control system in such an embodiment may identify an optimal tunable circuit configuration for the combination of the current wireless operation, current antenna configuration, and detected aggressor signal, and direct the tunable impedance matching circuits of the mobile information handling system to operate according to the identified optimal tunable circuit configuration. In such a way, the dynamic wireless antenna coexistence control system in an embodiment may remove the co-location interference caused by the aggressor signal while simultaneously transceiving both a useable WLAN signal and a useable WWAN signal.

For example, the WLAN 2×2 and WWAN 1×1 tunable circuit configuration table 502 in an embodiment may identify one or more optimal tunable circuit configurations for minimizing co-location interference for each of a plurality of combinations of varying antenna configurations and aggressor signals when the mobile information handling system is operating in a WLAN 2×2 and WWAN 1×1 operation. The mobile information handling system in an example embodiment may transmit a first WLAN signal from the WLAN main antenna, transmit and/or receive a second WLAN signal from the WLAN auxiliary antenna, and receive one WWAN signal from the WWAN main antenna pursuant to a WLAN 2×2 and WWAN 1×1 operation. In such an embodiment, if the dynamic wireless antenna coexistence control system receives an indication of co-site interference caused by a WLAN aggressor signal transmitted from the WLAN main antenna, the dynamic wireless antenna coexistence control system may refer to the top row of the group of rows 504 in the WLAN 2×2 and WWAN 1×1 tunable circuit configuration table 502 to identify the tunable circuit configuration "T1D+T4D+T2C" as the optimal configuration for minimizing the identified co-location interference. Identification of tunable circuits, as described with reference to the tunable circuit configuration table of FIG. 5 may refer to the tunable circuits described above with reference to FIG. 2. The "T1D+T4D+T2C" identification may denote the most optimal tunable circuit configuration involves routing the transmitting aggressor WLAN signal through the first tunable impedance matching circuit (T1) with an impedance set to the default, routing the second WLAN signal (unaffected by co-location interference) through the fourth tunable impedance matching circuit (T4) with an impedance set to the default, and routing the received affected WWAN signal through the second tunable impedance matching circuit (T2) with an impedance altered to result in improved power transfer and rejection, thus decreasing the effects of co-location interference from the transmitting WLAN aggressor signal.

Alternatively, in an embodiment in which the mobile information handling system is transmitting the first WLAN signal from the WLAN main antenna, the second WLAN signal from the WLAN auxiliary antenna, and one WWAN signal from the WWAN main antenna, and the dynamic wireless antenna coexistence control system receives an indication of colocation interference caused by the WLAN main antenna, the dynamic wireless antenna coexistence control system may refer to the second row of the group of rows 504 in the WLAN 2×2 and WWAN 1×1 tunable circuit configuration table 502 to identify the tunable circuit configuration "T1D+T4D+T2C+T3C" as the optimal configuration for minimizing the identified co-location interference. The "T1D+T4D+T2C+T3C" identification may denote the most optimal tunable circuit configuration involves routing the transmitting aggressor WLAN signal through the first tunable impedance matching circuit (T1) with an impedance set to the default, routing the second WLAN signal (unaffected by co-location interference) through the fourth tunable impedance matching circuit (T4) with an impedance set to the default, routing the received affected WWAN signal through the second tunable impedance matching circuit (T2) with an impedance altered to result in improved power transfer and rejection, thus decreasing the effects of co-location interference from the transmitting WLAN aggressor signal, and further shunting both the transmitting aggressor WLAN signal and the received affected WWAN signal through the third tunable impedance matching circuit (T3) operating as an S-CRDN with an impedance set so as to cancel out or minimize the imaginary component of the trans-admittance between affected antenna ports. By directing the first, fourth, second, and third tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

The dynamic wireless antenna coexistence control system in an embodiment may identify the tunable circuit configuration given in the first row of the set of rows 504 or the tunable circuit configuration given in the second row of the set of rows 504 when the mobile information handling system is transceiving a first WLAN signal from the WLAN main antenna, a second WLAN signal from the WLAN auxiliary antenna, and a single WWAN signal from the WWAN main antenna, and the WLAN main antenna signal causes co-location interference on the WWAN signal. The difference between these two configurations is the number of tunable impedance matching circuits through which the affected signal will be routed in order to eliminate the co-location interference. Passing the affected signal through more than one tunable impedance matching circuits may decrease the co-location interference more than passing it through only a single tunable impedance matching circuit, but may also require more battery power to operate multiple tunable impedance matching circuits simultaneously. In some embodiments, the dynamic wireless antenna coexistence control system may initially attempt to eliminate the co-location interference using the lowest number of tunable impedance matching circuits and may only move to a configuration employing a plurality of tunable impedance matching circuits where routing the affected signal through only a single tunable impedance matching circuit does not eliminate or lessen the co-location interference below manageable levels.

In another embodiment, the mobile information handling system in an example embodiment may transmit a first WLAN signal from the WLAN main antenna, a second WLAN signal from the WLAN auxiliary antenna, and receive one WWAN signal from the WWAN auxiliary antenna pursuant to a WLAN 2×2 and WWAN 1×1 operation. In such an embodiment, if the dynamic wireless antenna coexistence control system receives an indication of co-site interference caused by a WLAN aggressor signal transmitted from the WLAN auxiliary antenna, the dynamic wireless antenna coexistence control system may refer to the third row of the group of rows 504 in the WLAN 2×2 and WWAN 1×1 tunable circuit configuration table 502 to identify the tunable circuit configuration "T1D+T4D+T5C" as the optimal configuration for minimizing the identified co-location interference. The "T1D+T4D+T5C" identification may denote the most optimal tunable circuit configuration involves routing the transmitting aggressor WLAN signal through the fourth tunable impedance matching circuit (T4) with an impedance set to the default, routing the second WLAN signal (unaffected by co-location interference) through the first tunable impedance matching circuit (T4) with an impedance set to the default, and routing the received affected WWAN signal through the fifth tunable impedance matching circuit (T5) with an impedance altered to result in improved power transfer and rejection, thus decreasing the effects of co-location interference from the transmitting WLAN aggressor signal. By directing the first, fourth and fifth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

Alternatively, in an embodiment in which the mobile information handling system is transmitting a first WLAN signal from the WLAN main antenna, a second WLAN signal from the WLAN auxiliary antenna, and one WWAN signal from the WWAN auxiliary antenna, the dynamic wireless antenna coexistence control system may refer to the fourth row of the group of rows 504 in the WLAN 2×2 and WWAN 1×1 tunable circuit configuration table 502 to identify the tunable circuit configuration "T1D+T4D+T5C+T6C" as the optimal configuration for minimizing the identified co-location interference. The difference between the configuration described in the third and fourth rows of the group of rows 504 is the number of tunable impedance matching circuits through which the affected signal will be routed in order to eliminate the co-location interference.

The "T1D+T4D+T5C+T6C" identification may denote the most optimal tunable circuit configuration involves routing the transmitting aggressor WLAN signal through the fourth tunable impedance matching circuit (T4) with an impedance set to the default, routing the second WLAN signal (unaffected by co-location interference) through the first tunable impedance matching circuit (T1) with an impedance set to the default, routing the received affected WWAN signal through the fifth tunable impedance matching circuit (T5) with an impedance altered to result in improved power transfer and rejection, thus decreasing the effects of co-location interference from the transmitting WLAN aggressor signal, and further shunting both the transmitting aggressor WLAN signal and the received affected WWAN signal through the sixth tunable impedance matching circuit (T6) operating as an S-CRDN with an impedance set so as to cancel out or minimize the imaginary component of the trans-admittance between affected antenna ports. By directing the first, fourth, fifth, and sixth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

In another embodiment, the mobile information handling system in an example embodiment may transmit and/or receive a first WLAN signal from the WLAN main antenna, transmit and/or receive a second WLAN signal from the WLAN auxiliary antenna, and transmit one WWAN signal from the WWAN main antenna pursuant to a WLAN 2×2 and WWAN 1×1 operation. In such an embodiment, if the dynamic wireless antenna coexistence control system receives an indication of co-site interference caused by a WWAN aggressor signal transmitted from the WWAN main antenna, the dynamic wireless antenna coexistence control system may refer to the first row of the group of rows 506 in the WLAN 2×2 and WWAN 1×1 tunable circuit configuration table 502 to identify the tunable circuit configuration "T2D+T1C+T4D" as the optimal configuration for minimizing the identified co-location interference. The "T2D+T1C+T4D" identification may denote the most optimal tunable circuit configuration involves routing the transmitting aggressor WWAN signal through the second tunable impedance matching circuit (T2) with an impedance set to the default, routing the affected WLAN signal, received via the WLAN main antenna through the first tunable impedance matching circuit (T1) with an impedance altered to result in improved power transfer and rejection, thus decreasing the effects of co-location interference from the transmitting WLAN aggressor signal, and routing the second WLAN signal (unaffected by co-location interference) through the fourth tunable impedance matching circuit (T4) with an impedance set to the default. By directing the first, second, and fourth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

The difference between the configuration described in the group of rows 504 and the group of rows 506 is the identification of the aggressor signal. For example, both the first row of the group of rows 504 and the first row of the group of rows 506 describe the same antenna configuration in which the WLAN main antenna is transceiving a first WLAN signal, the WLAN auxiliary antenna is transceiving a second WLAN signal, the WWAN main antenna is transceiving a WWAN signal, and the WWAN auxiliary antenna is off. The only difference between the first row of the group of rows 504 and the first row of the group of rows 506 is that the optimal tunable circuit configuration of the first row of the group of rows 504 addresses co-location interference caused by a WLAN aggressor signal, while the optimal tunable circuit configuration of the first row of the group of rows 506 addresses co-location interference caused by a WWAN aggressor signal.

In other aspects of an embodiment in which the mobile information handling system is transmitting and/or receiving a first WLAN signal from the WLAN main antenna, transmitting and/or receiving a second WLAN signal from the WLAN auxiliary antenna, and transmitting one WWAN signal from the WWAN main antenna, the dynamic wireless antenna coexistence control system may refer to the first, second, third, or fourth rows of the group of rows 506 in the WLAN 2×2 and WWAN 1×1 tunable circuit configuration table 502 to identify a plurality of optimal tunable circuit configurations to choose from, each associated with that operation, antenna configuration, and identified WLAN aggressor signal. The difference between the configurations described in the first, second, third, and fourth rows of the group of rows 506 is the number of tunable impedance matching circuits through which each affected signal will be routed in order to eliminate or decrease the co-location interference.

For example, in an embodiment in which the mobile information handling system is receiving a first WLAN signal from the WLAN main antenna, a second WLAN signal from the WLAN auxiliary antenna, and transmitting one WWAN signal from the WWAN main antenna, the dynamic wireless antenna coexistence control system may refer to the second row of the group of rows 506 in the WLAN 2×2 and WWAN 1×1 tunable circuit configuration table 502 to identify the tunable circuit configuration "T2D+T1C+T3C+T4D" as the optimal configuration for minimizing the identified co-location interference. The "T2D+T1C+T3C+T4D" identification may denote the most optimal tunable circuit configuration involves routing the transmitting aggressor WWAN signal through the second tunable impedance matching circuit (T2) with an impedance set to the default, routing the first WLAN signal (affected by interference) through the first tunable impedance matching circuit (T1) with an impedance altered to result in improved power transfer and rejection, thus decreasing the effects of co-location interference from the transmitting WWAN aggressor signal, further shunting both the transmitting aggressor WWAN signal and the received affected WLAN signal through the third tunable impedance matching circuit (T3) operating as an S-CRDN with an impedance set so as to cancel out or minimize the imaginary component of the trans-admittance between affected antenna ports, and routing the second WLAN signal (unaffected by interference) through the fourth tunable impedance matching circuit (T4) with an impedance set to the default.

By directing the first, second, third, and fourth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

In another embodiment, the mobile information handling system in an example embodiment may transmit and/or receive a first WLAN signal from the WLAN main antenna, transmit and/or receive a second WLAN signal from the WLAN auxiliary antenna, and transmit one WWAN signal from the WWAN auxiliary antenna pursuant to a WLAN 2×2 and WWAN 1×1 operation. In such an embodiment, if the dynamic wireless antenna coexistence control system receives an indication of co-site interference caused by a WWAN aggressor signal, the dynamic wireless antenna coexistence control system may refer to the third row of the group of rows 506 in the WLAN 2×2 and WWAN 1×1 tunable circuit configuration table 502 to identify the tunable circuit configuration "T5D+T1D+T4C" as the optimal configuration for minimizing the identified co-location interference. The "T5D+T1D+T4C" identification may denote the most optimal tunable circuit configuration involves routing the transmitting aggressor WWAN signal through the fifth tunable impedance matching circuit (T5) with an impedance set to the default, routing the first WLAN signal (unaffected by co-location interference) through the first tunable impedance matching circuit (T1) with an impedance set to the default, routing the received affected second WLAN signal through the fourth tunable impedance matching circuit (T4) with an impedance altered to result in improved power transfer and rejection, thus decreasing the effects of co-location interference from the transmitting WWAN aggressor signal. By directing the first, fourth, and fifth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

In other aspects of an embodiment in which the mobile information handling system is transmitting and/or receiving a first WLAN signal from the WLAN main antenna, transmitting and/or receiving a second WLAN signal from the WLAN auxiliary antenna, and receiving one WWAN signal from the WWAN auxiliary antenna, the dynamic wireless antenna coexistence control system may refer to the fourth row of the group of rows 506 in the WLAN 2×2 and WWAN 1×1 tunable circuit configuration table 502 to identify an optimal tunable circuit configurations associated with that operation, antenna configuration, and identified WWAN aggressor signal. The difference between the configurations described in the third and fourth rows of the group of rows 506 is the number of tunable impedance matching circuits through which each affected signal will be routed in order to eliminate or decrease the co-location interference.

For example, in an embodiment in which the mobile information handling system is transmitting and/or receiving a first WLAN signal from the WLAN main antenna, transmitting and/or receiving a second WLAN signal from the WLAN auxiliary antenna, and transmitting one WWAN signal from the WWAN auxiliary antenna, the dynamic wireless antenna coexistence control system may refer to the fourth row of the group of rows 506 in the WLAN 2×2 and WWAN 1×1 tunable circuit configuration table 502 to identify the tunable circuit configuration "T5D+T1D+T6C+ T4C" as the optimal configuration for minimizing the identified co-location interference. The "T5D+T1D+T6C+T4C" identification may denote the most optimal tunable circuit configuration involves routing transmitting aggressor WWAN signal through the fifth tunable impedance matching circuit (T5) with an impedance set to the default, routing the first WLAN signal (unaffected by co-location interference) through the first tunable impedance matching circuit (T1) with an impedance set to the default, routing the received affected WLAN signal through the fourth tunable impedance matching circuit (T4) with an impedance altered to result in improved power transfer and rejection, thus decreasing the effects of co-location interference from the transmitting WLAN aggressor signal, and further shunting both the transmitting aggressor WLAN signal and the received affected WWAN signal through the sixth tunable impedance matching circuit (T6) operating as an S-CRDN with an impedance set so as to cancel out or minimize the imaginary component of the trans-admittance between affected antenna ports. By directing the first, third, fourth, and fifth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

FIG. 6 is a graphical diagram illustrating a third tunable circuit configuration table for operations in which a single WLAN signal and two WWAN signals are being transceived according to an embodiment of the present disclosure. The dynamic wireless antenna coexistence control system in an embodiment, upon receiving an indication of co-location interference, may identify an optimal tunable circuit configuration that includes one or more tunable impedance matching circuits through which a signal affected by colocation interference and/or an aggressor signal may be routed in order to decrease or remove the deleterious effects of the interference. The dynamic wireless antenna coexistence control system in such an embodiment may identify the optimal tunable circuit configuration through reference to a tunable circuit configuration table stored in memory.

In an embodiment, multiple tunable circuit configuration tables may be accessed, with each tunable circuit configuration table describing a different operation. For example, in embodiments in which a single WLAN signal and two WWAN signals are being transceived, a fourth tunable circuit configuration table may associate one or more optimal tunable circuit configurations with every possible combination of antenna configurations and aggressor signals for that operation. The dynamic wireless antenna coexistence control system in such an embodiment may identify an optimal tunable circuit configuration for the combination of the current wireless operation, current antenna configuration, and detected aggressor signal, and direct the tunable impedance matching circuits of the mobile information handling system to operate according to the identified optimal tunable circuit configuration. In such a way, the dynamic wireless antenna coexistence control system in an embodiment may remove the co-location interference caused by the aggressor signal while simultaneously transceiving both a useable WLAN signal and a useable WWAN signal.

For example, in an embodiment, the mobile information handling system may receive a WLAN signal from the WLAN main antenna, transceive a first WWAN signal from the WWAN main antenna, and transceive a second WWAN signal from the WWAN auxiliary antenna pursuant to a WLAN 1×1 and WWAN 2×2 operation. In such an embodiment, if the dynamic wireless antenna coexistence control system receives an indication of co-site interference caused by a WLAN aggressor signal, the dynamic wireless antenna coexistence control system may refer to the first row of the group of rows 604 in the WLAN 1×1 and WWAN 2×2 tunable circuit configuration table 602 to identify the tunable circuit configuration "T1D+T2C+T5D" as the optimal configuration for minimizing the identified co-location interference. Identification of tunable circuits, as described with reference to the tunable circuit configuration table of FIG. 6 may refer to the tunable circuits described above with reference to FIG. 2.

The "T1D+T2C+T5D" identification may denote the most optimal tunable circuit configuration involves routing the transmitting aggressor WLAN signal through the first tunable impedance matching circuit (T1) with an impedance set to the default, routing the first WLAN signal (affected by co-location interference) through the second tunable impedance matching circuit (T1) with an impedance altered to result in improved power transfer and rejection, thus decreasing the effects of co-location interference from the transmitting WLAN aggressor signal, and routing the second WWAN signal (unaffected by colocation interference) through the fifth tunable impedance matching circuit (T5) with an impedance set to the default. By directing the first, second, and fifth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

In other aspects of an embodiment in which the mobile information handling system may transmit a WLAN signal from the WLAN main antenna, a first WWAN signal from the WWAN main antenna, and a second WWAN signal from the WWAN auxiliary antenna pursuant to a WLAN 1×1 and WWAN 2×2 operation, the dynamic wireless antenna coexistence control system may refer to the second row of the group of rows 604 in the WLAN 1×1 and WWAN 2×2 tunable circuit configuration table 602 to identify the tunable circuit configuration "T1D+T2C+T3C+T5D" as the optimal configuration for minimizing the identified co-location interference. The "T1D+T2C+T3C+T5D" identification may denote the most optimal tunable circuit configuration involves routing the transmitting aggressor WLAN signal through the first tunable impedance matching circuit (T1) with an impedance set to the default, routing the second WLAN signal (unaffected by co-location interference) through the fifth tunable impedance matching circuit (T5) with an impedance set to the default, routing the received affected first WWAN signal through the second tunable impedance matching circuit (T2) with an impedance altered to result in improved power transfer and rejection, thus decreasing the effects of co-location interference from the transmitting WLAN aggressor signal, and further shunting both the transmitting aggressor WLAN signal and the received affected WWAN signal through the third tunable impedance matching circuit (T3) operating as an S-CRDN with an impedance set so as to cancel out or minimize the imaginary component of the trans-admittance between affected antenna ports.

By directing the first, second, third, and fifth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

In another embodiment, the mobile information handling system may transmit a WLAN signal from the WLAN auxiliary antenna, transmit and/or receive a first WWAN signal from the WWAN main antenna, and transmit and/or receive a second WWAN signal from the WWAN auxiliary antenna according to a WLAN 1×1 and WWAN 2×2 operation. In such an embodiment, if the dynamic wireless antenna coexistence control system receives an indication of co-site interference caused by a WLAN aggressor signal, the dynamic wireless antenna coexistence control system may refer to the third row of the group of rows 604 in the WLAN 1×1 and WWAN 2×2 tunable circuit configuration table 602 to identify the tunable circuit configuration "T4D+T2D+ T5C" as the optimal configuration for minimizing the identified co-location interference. The "T4D+T2D+T5C" identification may denote the most optimal tunable circuit configuration involves routing the transmitting aggressor WLAN signal through the fourth tunable impedance matching circuit (T4) with an impedance set to the default, routing the first WWAN signal (unaffected by co-location interference) through the second tunable impedance matching circuit (T2) with an impedance set to the default, and routing the received affected second WWAN signal through the fifth tunable impedance matching circuit (T5) with an impedance altered to result in improved power transfer and rejection, thus decreasing the effects of co-location interference from the transmitting WLAN aggressor signal. By directing the second, fourth, and fifth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

As another example, in an embodiment in which the mobile information handling system is transmitting a WLAN signal from the WLAN auxiliary antenna, transmitting and/or receiving a first WWAN signal from the WWAN main antenna, and transmitting and/or receiving a second WWAN signal from the WWAN auxiliary antenna, the dynamic wireless antenna coexistence control system may refer to the fourth row of the group of rows 604 in the WLAN 1×1 and WWAN 2×2 tunable circuit configuration table 602 to identify the tunable circuit configuration "T4D+ T2D+T5C+T6C" as the optimal configuration for minimizing the identified co-location interference. The "T4D+T2D+ T5C+T6C" identification may denote the most optimal tunable circuit configuration involves routing the transmitting aggressor WLAN signal through the fourth tunable impedance matching circuit (T4) with an impedance set to the default, routing the first WWAN signal (unaffected by co-location interference) through the second tunable impedance matching circuit (T2) with an impedance set to the default, routing the received affected second WWAN signal through the fifth tunable impedance matching circuit (T5) with an impedance altered to result in improved power transfer and rejection, thus decreasing the effects of co-location interference from the transmitting WLAN aggressor signal, and further shunting both the transmitting aggressor WLAN signal and the received affected WWAN signal through the sixth tunable impedance matching circuit (T6) operating as an S-CRDN with an impedance set so as to cancel out or minimize the imaginary component of the trans-admittance between affected antenna ports. By directing the second, fourth, fifth, and sixth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

In another embodiment, the WLAN 1×1 and WWAN 2×2 tunable circuit configuration table 602 may identify one or more optimal tunable circuit configurations for minimizing co-location interference for each of a plurality of combinations of varying antenna configurations and aggressor signals when the mobile information handling system is operating in a WLAN 1×1 and WWAN 2×2 operation and a WWAN signal causes co-location interference. The mobile information handling system in an example embodiment may transmit and/or receive a first WWAN signal from the WWAN main antenna, transmit and/or receive a second WWAN signal from the WWAN auxiliary antenna, and receive one WLAN signal from the WLAN main antenna. In such an embodiment, if the dynamic wireless antenna coexistence control system receives an indication of co-site interference caused by a WWAN aggressor signal transmitting from the main WWAN antenna, the dynamic wireless antenna coexistence control system may refer to the top row of the group of rows 606 in the WLAN 1×1 and WWAN 2×2 tunable circuit configuration table 602 to identify the tunable circuit configuration "T2D+T5D+T1C" as the optimal configuration for minimizing the identified co-location interference. The "T2D+T5D+T1C" identification may denote the most optimal tunable circuit configuration involves routing the transmitting aggressor WWAN signal through the second tunable impedance matching circuit (T2) with an impedance set to the default, routing the second WLAN signal through the fifth tunable impedance matching circuit (T5) with an impedance set to the default, and routing the received affected WLAN signal through the first tunable impedance matching circuit (T1) with an impedance altered to result in improved power transfer and rejection, thus decreasing the effects of co-location interference from the transmitting WLAN aggressor signal.

The difference between the configuration described in the group of rows 604 and the group of rows 606 is the identification of the aggressor signal. For example, both the first row of the group of rows 604 and the first row of the group of rows 606 describe the same antenna configuration in which the WWAN main antenna is transmitting a first WWAN signal, the WWAN auxiliary antenna is transmitting a second WWAN signal, the WLAN main antenna is transmitting a WLAN signal, and the WLAN auxiliary antenna is off. The only difference between the first row of the group of rows 604 and the first row of the group of rows 606 is that the optimal tunable circuit configuration of the first row of the group of rows 604 addresses co-location interference caused by a WLAN aggressor signal, while the optimal tunable circuit configuration of the first row of the group of rows 606 addresses co-location interference caused by a WWAN aggressor signal.

Alternatively, in an embodiment in which the mobile information handling system is transmitting and/or receiving the first WWAN signal from the WWAN main antenna, transmitting and/or receiving the second WWAN signal from the WWAN auxiliary antenna, and receiving one WLAN signal from the WLAN main antenna, the dynamic wireless antenna coexistence control system may refer to the second row of the group of rows 606 in the WLAN 1×1 and WWAN 2×2 tunable circuit configuration table 602 to identify the tunable circuit configuration "T2D+T5D+T1C+T3C" as the optimal configuration for minimizing the identified co-location interference. The "T2D+T5D+T1C+T3C" identification may denote the most optimal tunable circuit configuration involves routing the transmitting aggressor WWAN signal through the second tunable impedance matching circuit (T2) with an impedance set to the default, routing the second WWAN signal through the fifth tunable impedance matching circuit (T5) with an impedance set to the default, routing the received affected WLAN signal through the first tunable impedance matching circuit (T1) with an impedance altered to result in improved power transfer and rejection, thus decreasing the effects of co-location interference from the transmitting WLAN aggressor signal, and further shunting both the transmitting aggressor first WWAN signal and the received affected WLAN signal through the third tunable impedance matching circuit (T3) operating as an S-CRDN with an impedance set so as to cancel out or minimize the imaginary component of the trans-admittance between affected antenna ports. By directing the first, second, third, and fifth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

The dynamic wireless antenna coexistence control system in an embodiment may identify the tunable circuit configuration given in the first row of the set of rows 606 or the tunable circuit configuration given in the second row of the set of rows 606 when the mobile information handling system is transmitting the first WWAN signal from the WWAN main antenna, the second WWAN signal from the WWAN auxiliary antenna, and one WLAN signal from the WLAN main antenna, and the WLAN signal causes co-location interference on the WWAN signal. The difference between these two configurations is the number of tunable impedance matching circuits through which the affected signal will be routed in order to eliminate the co-location interference. Passing the affected signal through more than one tunable impedance matching circuits may decrease the co-location interference more than passing it through only a single tunable impedance matching circuit, but may also require more battery power to operate multiple tunable impedance matching circuits simultaneously. In some embodiments, the dynamic wireless antenna coexistence control system may initially attempt to eliminate the co-location interference using the lowest number of tunable impedance matching circuits and may only move to a configuration employing a plurality of tunable impedance matching circuits where routing the affected signal through only a single tunable impedance matching circuit does not eliminate or lessen the co-location interference below manageable levels.

In another embodiment, the mobile information handling system may transmit and/or receive a first WWAN signal from the WWAN main antenna, transmit and/or receive a second WWAN signal from the WWAN auxiliary antenna, and receive one WLAN signal from the WLAN auxiliary antenna, pursuant to a WLAN 1×1 and WWAN 2×2 operation. In such an embodiment, if the dynamic wireless antenna coexistence control system receives an indication of co-site interference caused by a WWAN aggressor signal transmitted from the WWAN auxiliary antenna, the dynamic wireless antenna coexistence control system may refer to the third row of the group of rows 606 in the WLAN 1×1 and WWAN 2×2 tunable circuit configuration table 602 to identify the tunable circuit configuration "T2D+T5D+T4C" as the optimal configuration for minimizing the identified co-location interference. The "T2D+T5D+T4C" identification may denote the most optimal tunable circuit configuration involves routing the transmitting aggressor second WWAN signal through the fifth tunable impedance matching circuit (T5) with an impedance set to the default, routing the first WWAN signal (unaffected by co-location interference) through the second tunable impedance matching circuit (T2) with an impedance set to the default, and routing the received affected WLAN signal through the fourth tunable impedance matching circuit (T4) with an impedance altered to result in improved power transfer and rejection, thus decreasing the effects of co-location interference from the transmitting WWAN aggressor signal. By directing the second, fourth and fifth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

Alternatively, in an embodiment in which the mobile information handling system is transmitting and/or receiving the first WWAN signal from the WWAN main antenna, transmitting and/or receiving the second WWAN signal from the WWAN auxiliary antenna, and receiving one WLAN signal from the WLAN auxiliary antenna, the dynamic wireless antenna coexistence control system may refer to the fourth row of the group of rows 606 in the WLAN 1×1 and WWAN 2×2 tunable circuit configuration table 602 to identify the tunable circuit configuration "T2D+T5D+T4C+T6C" as the optimal configuration for minimizing the identified co-location interference. The difference between the configuration described in the third and fourth rows of the group of rows 606 is the number of tunable impedance matching circuits through which the affected signal will be routed in order to eliminate the co-location interference.

The "T2D+T5D+T4C+T6C" identification may denote the most optimal tunable circuit configuration involves routing the transmitting aggressor second WWAN signal through the fifth tunable impedance matching circuit (T5) with an impedance set to the default, routing the first WWAN signal (unaffected by co-location interference) through the second tunable impedance matching circuit (T2) with an impedance set to the default, routing the received affected WLAN signal through the fourth tunable impedance matching circuit (T4) with an impedance altered to result in improved power transfer and rejection, thus decreasing the effects of co-location interference from the transmitting WWAN aggressor signal, and further shunting both the transmitting aggressor WWAN signal and the received affected WLAN signal through the sixth tunable impedance matching circuit (T6) operating as an S-CRDN with an impedance set so as to cancel out or minimize the imaginary component of the trans-admittance between affected antenna ports. By directing the second, fourth, fifth, and sixth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

FIG. 7 is a graphical diagram illustrating a fourth tunable circuit configuration table for operations in which two WLAN signals and two WWAN signals are being transceived according to an embodiment of the present disclosure. The dynamic wireless antenna coexistence control system in an embodiment, upon receiving an indication of co-location interference, may identify an optimal tunable circuit configuration that includes one or more tunable impedance matching circuits through which a signal affected by co-location interference may be routed in order to decrease or eliminate the deleterious effects of the detected co-location interference. The dynamic wireless antenna coexistence control system in such an embodiment may identify the optimal tunable circuit configuration through reference to a tunable circuit configuration table stored in memory.

In an embodiment, multiple tunable circuit configuration tables may be accessed, with each tunable circuit configuration table describing a different operation. For example, in embodiments in which two WLAN signal and two WWAN signals are being transceived, a fifth tunable circuit configuration table may associate one or more optimal tunable circuit configurations with every possible combination of antenna configurations and aggressor signals for that operation. The dynamic wireless antenna coexistence control system in such an embodiment may identify an optimal tunable circuit configuration for the combination of the current wireless operation, current antenna configuration, and detected aggressor signal, and direct the tunable impedance matching circuits of the mobile information handling system to operate according to the identified optimal tunable circuit configuration. In such a way, the dynamic wireless antenna coexistence control system in an embodiment may remove the co-location interference caused by the aggressor signal while simultaneously transceiving both a useable WLAN signal and a useable WWAN signal.

For example, in an embodiment, the mobile information handling system may transmit and/or receive a first WLAN signal from the WLAN main antenna, a second WLAN signal from the WLAN auxiliary antenna, a first WWAN signal from the WWAN main antenna, and a second WWAN signal from the WWAN auxiliary antenna pursuant to a WLAN 2×2 and WWAN 2×2 operation, and the dynamic wireless antenna coexistence control system may receive an indication of co-site interference caused by a WLAN aggressor signal transmitted from the WLAN main antenna. In such an embodiment, the dynamic wireless antenna coexistence control system may refer to the first row of the group of rows 704 in the WLAN 2×2 and WWAN 2×2 tunable circuit configuration table 702 to identify the tunable circuit configuration "T1D+T4D+T2C+T5D" as the optimal configuration for minimizing the identified co-location interference. Identification of tunable circuits, as described with reference to the tunable circuit configuration table of FIG. 7 may refer to the tunable circuits described above with reference to FIG. 2.

The "T1D+T4D+T2C+T5D" identification may denote the most optimal tunable circuit configuration involves routing the transmitting aggressor first WLAN signal through the first tunable impedance matching circuit (T1) with an impedance set to the default, routing the first WWAN signal (affected by co-location interference) through the second tunable impedance matching circuit (T2) with an impedance altered to result in improved power transfer and rejection, thus decreasing the effects of co-location interference from the transmitting WLAN aggressor, routing the second WWAN signal (unaffected by co-location interference) through the fifth tunable impedance matching circuit (T5) with an impedance set to the default, and routing the second WLAN signal (unaffected by co-location interference) through the fourth tunable impedance matching circuit (T4) with an impedance set to the default. By directing the first, second, fourth, and fifth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

In other aspects of an embodiment in which the mobile information handling system may transmit and/or receive a first WLAN signal from the WLAN main antenna, a second WLAN signal from the WLAN auxiliary antenna, a first WWAN signal from the WWAN main antenna, and a second WWAN signal from the WWAN auxiliary antenna and the dynamic wireless antenna coexistence control system receives an indication of co-location interference from a WLAN aggressor signal transmitted from the main WLAN antenna, the dynamic wireless antenna coexistence control system may refer to the second row of the group of rows 704 in the WLAN 2×2 and WWAN 2×2 tunable circuit configuration table 702 to identify the tunable circuit configuration "T1D+T4D+T2C+T3C+T5D" as the optimal configuration for minimizing the identified co-location interference. The "T1D+T4D+T2C+T3C+T5D" identification may denote the most optimal tunable circuit configuration involves routing transmitting aggressor first WLAN signal through the first tunable impedance matching circuit (T1) with an impedance set to the default, routing the first WWAN signal (affected by co-location interference) through the second tunable impedance matching circuit (T2) with an impedance altered to result in improved power transfer and rejection, thus decreasing the effects of co-location interference from the transmitting WLAN aggressor, routing the second WWAN signal (unaffected by co-location interference) through the fifth tunable impedance matching circuit (T5) with an impedance set to the default, routing the second WLAN signal (unaffected by co-location interference) through the fourth tunable impedance matching circuit (T4) with an impedance set to the default, and further shunting both the transmitting aggressor WLAN signal and the received affected WWAN signal through the third tunable impedance matching circuit (T3) operating as an S-CRDN with an impedance set so as to cancel out or minimize the imaginary component of the trans-admittance between affected antenna ports. By directing the first, second, third, fourth, and fifth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

As another example, in an embodiment in which the mobile information handling system may transmit and/or receive a first WLAN signal from the WLAN main antenna, a second WLAN signal from the WLAN auxiliary antenna, a first WWAN signal from the WWAN main antenna, and a second WWAN signal from the WWAN auxiliary antenna and the dynamic wireless antenna coexistence control system receives an indication of co-location interference from a WLAN aggressor signal transmitted from the WLAN auxiliary antenna, the dynamic wireless antenna coexistence control system may refer to the third row of the group of rows 704 in the WLAN 2×2 and WWAN 2×2 tunable circuit configuration table 702 to identify the tunable circuit configuration "T1D+T4D+T2D+T5C" as the optimal configuration for minimizing the identified co-location interference. The "T1D+T4D+T2D+T5C" identification may denote the most optimal tunable circuit configuration involves routing the transmitting aggressor second WLAN signal through the fourth tunable impedance matching circuit (T4) with an impedance set to the default, routing the second WWAN signal (affected by co-location interference) through the fifth tunable impedance matching circuit (T5) with an impedance altered to result in improved power transfer and rejection, thus decreasing the effects of co-location interference from the transmitting WLAN aggressor, routing the first WWAN signal (unaffected by co-location interference) through the second tunable impedance matching circuit (T2) with an impedance set to the default, and routing the first WLAN signal (unaffected by co-location interference) through the first tunable impedance matching circuit (T1) with an impedance set to the default. By directing the first, second, fourth, fifth, and sixth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

As yet another example, in an embodiment in which the mobile information handling system may transmit and/or receive a first WLAN signal from the WLAN main antenna, a second WLAN signal from the WLAN auxiliary antenna, a first WWAN signal from the WWAN main antenna, and a second WWAN signal from the WWAN auxiliary antenna and the dynamic wireless antenna coexistence control system receives an indication of co-location interference from a WLAN aggressor signal transmitting from the WLAN auxiliary antenna, the dynamic wireless antenna coexistence control system may refer to the fourth row of the group of rows 704 in the WLAN 2×2 and WWAN 2×2 tunable circuit configuration table 702 to identify the tunable circuit configuration "T1D+T4D+T2D+T5C+T6C" as the optimal configuration for minimizing the identified co-location interference. The "T1D+T4D+T2D+T5C+T6C" identification may denote the most optimal tunable circuit configuration involves routing the transmitting aggressor second WLAN signal through the fourth tunable impedance matching circuit (T4) with an impedance set to the default, routing the second WWAN signal (affected by co-location interference) through the fifth tunable impedance matching circuit (T5) with an impedance altered to result in improved power transfer and rejection, thus decreasing the effects of co-location interference from the transmitting WLAN aggressor, routing the first WWAN signal (unaffected by co-location interference) through the second tunable impedance matching circuit (T2) with an impedance set to the default, and routing the first WLAN signal (unaffected by co-location interference) through the first tunable impedance matching circuit (T1) with an impedance set to the default, and further shunting both the transmitting aggressor WLAN signal and the received affected WWAN signal through the sixth tunable impedance matching circuit (T6) operating as an S-CRDN with an impedance set so as to cancel out or minimize the imaginary component of the trans-admittance between affected antenna ports. By directing the first, second, third, fourth, fifth, and sixth tunable impedance matching circuits of the mobile information handling system to operate according to the identified optimal tunable circuit configuration, the dynamic wireless antenna coexistence control system in such an embodiment may remove the identified co-location interference caused by the WLAN signal while simultaneously transceiving both a useable WLAN signal and a useable WWAN signal.

In another embodiment, the mobile information handling system may transmit and/or receive a first WLAN signal from the WLAN main antenna, a second WLAN signal from the WLAN auxiliary antenna, a first WWAN signal from the WWAN main antenna, and a second WWAN signal from the WWAN auxiliary antenna pursuant to a WLAN 2×2 and WWAN 2×2 operation, and the dynamic wireless antenna coexistence control system may receive an indication of co-site interference caused by a WWAN aggressor signal transmitted from the WWAN main antenna. In such an embodiment, the dynamic wireless antenna coexistence control system may refer to the first row of the group of rows 706 in the WLAN 2×2 and WWAN 2×2 tunable circuit configuration table 702 to identify the tunable circuit configuration "T2D+T5D+T1C+T4D" as the optimal configuration for minimizing the identified co-location interference. The "T2D+T5D+T1C+T4D" identification may denote the most optimal tunable circuit configuration involves routing the transmitting aggressor first WWAN signal through the second tunable impedance matching circuit (T2) with an impedance set to the default, routing the first WLAN signal (affected by co-location interference) through the first tunable impedance matching circuit (T1) with an impedance altered to result in improved power transfer and rejection, thus decreasing the effects of co-location interference from the transmitting WWAN aggressor, routing the second WLAN signal (unaffected by co-location interference) through the fourth tunable impedance matching circuit (T4) with an impedance set to the default, and routing the second WWAN signal (unaffected by co-location interference) through the fifth tunable impedance matching circuit (T5) with an impedance set to the default. By directing the first, second, fourth, and fifth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

In other aspects of an embodiment in which the mobile information handling system is transmitting and/or receiving a first WLAN signal from the WLAN main antenna, a second WLAN signal from the WLAN auxiliary antenna, a first WWAN signal from the WWAN main antenna, and a second WWAN signal from the WWAN auxiliary antenna, and the dynamic wireless antenna coexistence control system receives an indication of co-location interference caused by the WWAN signal transmitted from the WWAN main antenna, the dynamic wireless antenna coexistence control system may refer to the second row of the group of rows 706 in the WLAN 2×2 and WWAN 2×2 tunable circuit configuration table 702 to identify the tunable circuit configuration "T2D+T5D+T1C+T3C+T4D" as the optimal configuration for minimizing the identified co-location interference. The "T2D+T5D+T1C+T3C+T4D" identification may denote the most optimal tunable circuit configuration involves routing the transmitting aggressor first WWAN signal through the second tunable impedance matching circuit (T2) with an impedance set to the default, routing the first WLAN signal (affected by co-location interference) through the first tunable impedance matching circuit (T1) with an impedance altered to result in improved power transfer and rejection, thus decreasing the effects of co-location interference from the transmitting WWAN aggressor, routing the second WLAN signal (unaffected by co-location interference) through the fourth tunable impedance matching circuit (T4) with an impedance set to the default, and routing the second WWAN signal (unaffected by co-location interference) through the fifth tunable impedance matching circuit (T5) with an impedance set to the default, and further shunting both the transmitting aggressor WWAN signal and the received affected WLAN signal through the third tunable impedance matching circuit (T3) operating as an S-CRDN with an impedance set so as to cancel out or minimize the imaginary component of the trans-admittance between affected antenna ports. By directing the first, second, third, fourth, and fifth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

As another example, in an embodiment in which the mobile information handling system is transmitting and/or receiving a first WLAN signal from the WLAN main antenna, a second WLAN signal from the WLAN auxiliary antenna, a first WWAN signal from the WWAN main antenna, and a second WWAN signal from the WWAN auxiliary antenna, and the dynamic wireless antenna coexistence control system receives an indication of co-location interference caused by the WWAN signal transmitted from the WWAN auxiliary antenna, the dynamic wireless antenna coexistence control system may refer to the third row of the group of rows 606 in the WLAN 2×2 and WWAN 2×2 tunable circuit configuration table 702 to identify the tunable circuit configuration "T2D+T5D+T1D+T4C" as the optimal configuration for minimizing the identified co-location interference. The "T2D+T5D+T1D+T4C" identification may denote the most optimal tunable circuit configuration involves routing the transmitting aggressor second WWAN signal through the fifth tunable impedance matching circuit (T5) with an impedance set to the default, routing the second WLAN signal (affected by co-location interference) through the fourth tunable impedance matching circuit (T4) with an impedance altered to result in improved power transfer and rejection, thus decreasing the effects of co-location interference from the transmitting WWAN aggressor, routing the first WLAN signal (unaffected by co-location interference) through the first tunable impedance matching circuit (T1) with an impedance set to the default, and routing the first WWAN signal (unaffected by co-location interference) through the second tunable impedance matching circuit (T2) with an impedance set to the default. By directing the first, second, fourth, fifth, and sixth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

As yet another example, in an embodiment in which the mobile information handling system is transmitting and/or receiving a first WLAN signal from the WLAN main antenna, a second WLAN signal from the WLAN auxiliary antenna, a first WWAN signal from the WWAN main antenna, and a second WWAN signal from the WWAN auxiliary antenna, and the dynamic wireless antenna coexistence control system receives an indication of co-location interference caused by the WWAN signal transmitted by the WWAN auxiliary antenna, the dynamic wireless antenna coexistence control system may refer to the fourth row of the group of rows 706 in the WLAN 2×2 and WWAN 2×2 tunable circuit configuration table 702 to identify the tunable circuit configuration "T2D+T5D+T1D+T4C+T6C" as the optimal configuration for minimizing the identified co-location interference. The "T2D+T5D+T1D+T4C+T6C" identification may denote the most optimal tunable circuit configuration involves routing the transmitting aggressor second WWAN signal through the fifth tunable impedance matching circuit (T5) with an impedance set to the default, routing the second WLAN signal (affected by co-location interference) through the fourth tunable impedance matching circuit (T4) with an impedance altered to result in improved power transfer and rejection, thus decreasing the effects of co-location interference from the transmitting WWAN aggressor, routing the first WLAN signal (unaffected by co-location interference) through the first tunable impedance matching circuit (T1) with an impedance set to the default, routing the first WWAN signal (unaffected by co-location interference) through the second tunable impedance matching circuit (T2) with an impedance set to the default, and further shunting both the transmitting aggressor WWAN signal and the received affected WLAN signal through the sixth tunable impedance matching circuit (T6) operating as an S-CRDN with an impedance set so as to cancel out or minimize the imaginary component of the trans-admittance between affected antenna ports. By directing the first, second, third, fourth, fifth, and sixth tunable impedance matching circuits of the mobile information handling system to operate according to the identified optimal tunable circuit configuration, the dynamic wireless antenna coexistence control system in such an embodiment may remove the identified co-location interference caused by the WWAN signal while simultaneously transceiving both a useable WLAN signal and a useable WWAN signal.

Figure 8:
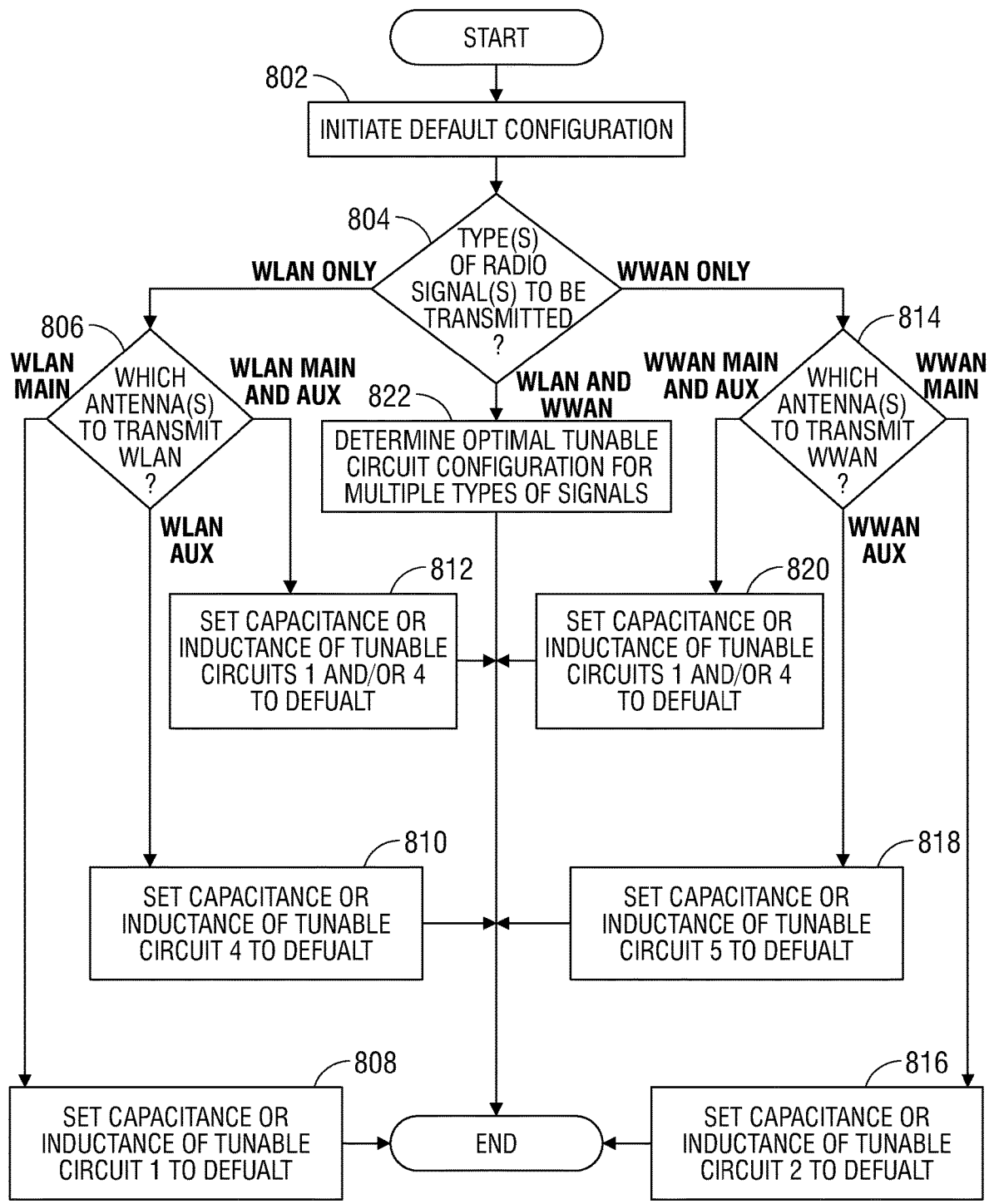
FIG. 8 is a flow diagram illustrating a method of setting the capacitances of an optimal configuration of tunable impedance matching circuits according to an embodiment of the present disclosure.

FIG. 8 is a flow diagram illustrating a method of setting the capacitances of an optimal configuration of tunable impedance matching circuits to optimize signal quality of WLAN and WWAN signals according to an embodiment of the present disclosure. The dynamic wireless antenna coexistence control system in an embodiment may transmit instructions to one or more interference controllers, which, in response, may route WLAN and/or WWAN signals to tunable impedance matching circuits according to an optimal tunable circuit configuration. Each tunable impedance matching circuit receiving a WLAN or WWAN signal in an embodiment may apply an impedance set by the one or more interference controllers in response to instructions from the dynamic wireless antenna co-existence control system. By applying an impedance to an incoming signal, each tunable impedance matching circuit may condition or tune the incoming signal in order to decrease deleterious effects of co-location interference.

The determination of whether to tune an incoming signal according to a default impedance value or in order to decrease deleterious effects of co-location interference may depend on the type(s) of signal(s) currently being transceived, and whether those signals are interfering with one another. In embodiments where only a WLAN signal or only a WWAN signal is being transceived, co-location interference between WLAN and WWAN signals may not be present. When co-location interference is not an issue in an embodiment, the mobile information handling system may transmit a WLAN signal or a WWAN signal tuned according to a default impedance value.

At block 802, in an embodiment, the dynamic wireless antenna coexistence control system may initiate a default tunable impedance matching circuit configuration. The dynamic wireless antenna coexistence control system in an embodiment may initiate this default configuration regardless of the current wireless operation or antenna configuration employed. For example, the dynamic wireless antenna coexistence control system in an embodiment may initiate this default configuration regardless of whether the mobile information handling system is currently transmitting one or two WLAN signals, and/or one or two WWAN signals. Further, if only one WLAN and/or one WWAN signal is being transceived, the dynamic wireless antenna coexistence control system may not have information indicating from which of the main or auxiliary antennas each wireless signal is being transceived.

In such embodiments, the dynamic wireless antenna coexistence control system may initiate a default configuration in which the first, second, fourth, and fifth tunable impedance matching circuits 232, 234, 260, and 262 shown in FIG. 2 are operable. By making each of these tunable impedance matching circuits operable, the dynamic wireless antenna coexistence control system in an embodiment may ensure each signal that potentially may be transmitted will be tuned for optimization prior to transmission. For example, and with reference to FIG. 2, if a first WLAN signal is transmitted via a WLAN main antenna 242, the first WLAN signal may be routed through the first tunable impedance matching circuit 232 in order to optimize that signal. As another example, if a first WLAN signal or a second WLAN signal is transmitted via a WLAN auxiliary antenna 270, the first WLAN signal or second WLAN signal may be routed through the fourth tunable impedance matching circuit 260 in order to optimize that signal. As another example, if a first WWAN signal is transmitted via a WWAN main antenna 250, the first WWAN signal may be routed through the second tunable impedance matching circuit 234 in order to optimize that signal. As yet another example, if a first WWAN signal or a second WWAN signal is transmitted via a WWAN auxiliary antenna 278, the first WWAN signal or second WWAN signal may be routed through the fifth tunable impedance matching circuit 262 in order to optimize that signal. As described above, when co-location interference is not an issue in an embodiment, the mobile information handling system may transmit a WLAN signal or a WWAN signal tuned so as to maximize efficiency of the transmitted signal in order to conserve battery power while maintaining signal quality. Thus, at block 802, when no indication of co-location interference has been received, each of the operable tunable impedance matching circuits (e.g. 232, 234, 260, and 262 shown in FIG. 2) may be set to a default impedance value (e.g. 50 ohms).

Returning to FIG. 8, at block 804, the dynamic wireless antenna coexistence control system may determine which types of radio signals are being transmitted. As described above, the determination of whether to tune an incoming signal according to a default impedance value or in order to decrease deleterious effects of co-location interference in an embodiment may depend on the type(s) of signal(s) currently being transmitted, and whether those signals are interfering with one another. If only a WLAN signal or signals are being transmitted, co-location interference may not be a concern in an embodiment, and the method may proceed to block 806. If only a WWAN signal or signals are being transmitted, co-location interference may similarly not be a concern in an embodiment, and the method may proceed to block 814. If one or more WLAN signals are being transmitted simultaneously with one or more WWAN signals, co-location interference may be a concern in an embodiment, and the method may proceed to block 822.

At block 806, in an embodiment in which only one or more WLAN signals are being transmitted and no WWAN signals are being transmitted, the dynamic wireless antenna coexistence control system may determine which antenna(s) are transmitting WLAN signals. As described above with reference to FIG. 2, if a first WLAN signal is transmitted via a WLAN main antenna 242, the first WLAN signal may be routed through the first tunable impedance matching circuit 232, and if a first WLAN signal or a second WLAN signal is transmitted via a WLAN auxiliary antenna 270, the first WLAN signal or second WLAN signal may be routed through the fourth tunable impedance matching circuit 260. The dynamic wireless antenna coexistence control system in an embodiment may conserve power by only applying an impedance at a tunable impedance matching circuit if a signal is being routed through it. Thus, the choice of which tunable impedance matching circuits through which to route signals may depend on the number of antennas transmitting a given signal. If the dynamic wireless antenna coexistence control system in an embodiment determines the mobile information handling system is transmitting a WLAN signal via the WLAN main antenna only, the method may proceed to block 808. If the dynamic wireless antenna coexistence control system in an embodiment determines the mobile information handling system is transmitting a WLAN signal via the WLAN auxiliary antenna only, the method may proceed to block 810. If the dynamic wireless antenna coexistence control system in an embodiment determines the mobile information handling system is transmitting a first WLAN signal via the WLAN main antenna and a second WLAN signal via the WLAN auxiliary antenna, the method may proceed to block 812.

At block 808, the dynamic wireless antenna coexistence control system in an embodiment may set the capacitance or inductance of the first tunable circuit to maximize efficiency of the WLAN signal transmitted via the main WLAN antenna. The dynamic wireless antenna co-existence control system in an embodiment may identify the optimal tunable circuit configuration by reference to one or more tunable circuit configuration tables describing optimal tunable circuit configurations for several operating conditions. As described above, multiple tunable circuit configuration tables may be accessed, with each tunable circuit configuration table describing a different operation. For example, the dynamic wireless antenna coexistence control system in an embodiment in which the mobile information handling system is transmitting a WLAN signal via the WLAN main antenna only according to a WLAN 1×1 operation, the dynamic wireless antenna coexistence control system may identify the optimal tunable circuit configuration of T1D in the top row of the group of rows 304 in the single signal type transmission tunable circuit configuration table 302 shown in FIG. 3.

Upon identifying the optimal tunable circuit configuration within the tunable circuit configuration table associated with the current wireless operation, the dynamic wireless antenna coexistence control system in an embodiment may transmit instructions to one or more interference controllers to place one or more tunable impedance matching circuits in the identified optimal tunable circuit configuration. For example, and with reference to FIG. 2, if the dynamic wireless antenna coexistence control system 132 in an embodiment determines the mobile information handling system is transmitting a WLAN signal via the WLAN main antenna 242 only, it may transmit instructions to the first interference controller 220 to set the capacitance or inductance of the first tunable circuit 232 to the default impedance value according to the optimal tunable circuit configuration "T1D" identified directly above. By operating only the first tunable impedance matching circuit in an embodiment, the dynamic wireless antenna coexistence control system may conserve power that would otherwise be directed toward operation of other tunable impedance matching circuits (e.g., the second, third, fourth, fifth, and sixth tunable impedance matching circuits 234, 236, 260, 262, and 264).

Returning to FIG. 8, at block 810, the dynamic wireless antenna coexistence control system in an embodiment may set the capacitance or inductance of the fourth tunable circuit to maximize efficiency of the WLAN signal transmitted via the WLAN auxiliary antenna. In an embodiment in which the mobile information handling system is transmitting one WLAN signal via the WLAN auxiliary antenna according to a WLAN 1×1 operation, the dynamic wireless antenna co-existence control system in an embodiment may identify the optimal tunable circuit configuration by reference to the single signal type transmission tunable circuit configuration table 302 shown in FIG. 3. For example, the dynamic wireless antenna coexistence control system in such an embodiment may identify the optimal tunable circuit configuration of T4D in the bottom row of the group of rows 304 in the single signal type transmission tunable circuit configuration table 302 shown in FIG. 3.

Upon identifying the optimal tunable circuit configuration within the tunable circuit configuration table associated with the current wireless operation, the dynamic wireless antenna coexistence control system in an embodiment may transmit instructions to one or more interference controllers to place one or more tunable impedance matching circuits in the identified optimal tunable circuit configuration. For example, and with reference to FIG. 2, if the dynamic wireless antenna coexistence control system 132 in an embodiment determines the mobile information handling system is transmitting a WLAN signal via the WLAN auxiliary antenna 270 only, it may transmit instructions to the second interference controller 222 to set the capacitance or inductance of the fourth tunable circuit 260 to the default impedance value. By operating only the fourth tunable impedance matching circuit in an embodiment, the dynamic wireless antenna coexistence control system may conserve power that would otherwise be directed toward operation of other tunable impedance matching circuits (e.g., the first, second, third, fifth, and sixth tunable impedance matching circuits 232, 234, 236, 262, and 264).

Returning to FIG. 8, at block 812, the dynamic wireless antenna coexistence control system in an embodiment may set the capacitance or inductance of the first and fourth tunable circuits to maximize efficiency of the WLAN signals transmitted via the main WLAN antenna and the WLAN auxiliary antenna. In an embodiment in which the mobile information handling system is transmitting a first WLAN signal via the WLAN main antenna and a second WLAN signal via the WLAN auxiliary antenna according to a WLAN 2×2 operation, the dynamic wireless antenna coexistence control system in an embodiment may identify the optimal tunable circuit configuration by reference to the single signal type transmission tunable circuit configuration table 302 shown in FIG. 3. For example, the dynamic wireless antenna coexistence control system in such an embodiment may identify the optimal tunable circuit configuration of T1D+T4D in row 308 in the single signal type transmission tunable circuit configuration table 302 shown in FIG. 3.

Upon identifying the optimal tunable circuit configuration within the tunable circuit configuration table associated with the current wireless operation, the dynamic wireless antenna coexistence control system in an embodiment may transmit instructions to one or more interference controllers to place one or more tunable impedance matching circuits in the identified optimal tunable circuit configuration. For example, and with reference to FIG. 2, if the dynamic wireless antenna coexistence control system 132 in an embodiment determines the mobile information handling system is transmitting a first WLAN signal via the WLAN main antenna 242 and a second WLAN signal via the WLAN auxiliary antenna 270, it may transmit instructions to the first interference controller 220 to set the capacitance or inductance of the first tunable circuit 232 to the default impedance value and transmit instructions to the second interference controller 222 to set the capacitance or inductance of the fourth tunable circuit 260 to the default impedance value. By operating only the first and fourth tunable impedance matching circuits in an embodiment, the dynamic wireless antenna coexistence control system may conserve power that would otherwise be directed toward operation of other tunable impedance matching circuits (e.g., the second, third, fifth, and sixth tunable impedance matching circuits 234, 236, 262, and 264).

Returning to FIG. 8, at block 814, in an embodiment in which only one or more WWAN signals are being transmitted and no WLAN signals are being transmitted, the dynamic wireless antenna coexistence control system may determine which antenna(s) are transmitting WWAN signals. As described above with reference to FIG. 2, if a first WWAN signal is transmitted via a WWAN main antenna 250, the first WWAN signal may be routed through the second tunable impedance matching circuit 234, and if a first WWAN signal or a second WWAN signal is transmitted via a WWAN auxiliary antenna 278, the first WWAN signal or second WWAN signal may be routed through the fifth tunable impedance matching circuit 262. The dynamic wireless antenna coexistence control system in an embodiment may conserve power by only applying an impedance at a tunable impedance matching circuit if a signal is being routed through it. Thus, the choice of which tunable impedance matching circuits through which to route signals may depend on the number of antennas transmitting a given signal. If the dynamic wireless antenna coexistence control system in an embodiment determines the mobile information handling system is transmitting a WWAN signal via the WWAN main antenna only, the method may proceed to block 816. If the dynamic wireless antenna coexistence control system in an embodiment determines the mobile information handling system is transmitting a WWAN signal via the WWAN auxiliary antenna only, the method may proceed to block 818. If the dynamic wireless antenna coexistence control system in an embodiment determines the mobile information handling system is transmitting a first WWAN signal via the WWAN main antenna and a second WWAN signal via the WWAN auxiliary antenna, the method may proceed to block 820.

At block 816, the dynamic wireless antenna coexistence control system in an embodiment may set the capacitance or inductance of the second tunable circuit according to a default impedance value or in order to decrease deleterious effects of co-location interference. The dynamic wireless antenna co-existence control system in an embodiment may identify the optimal tunable circuit configuration by reference to one or more tunable circuit configuration tables describing optimal tunable circuit configurations for several operating conditions. As described above, multiple tunable circuit configuration tables may be accessed, with each tunable circuit configuration table describing a different operation. For example, the dynamic wireless antenna coexistence control system in an embodiment in which the mobile information handling system is transmitting a WWAN signal via the WWAN main antenna only according to a WWAN 1×1 operation, the dynamic wireless antenna coexistence control system may identify the optimal tunable circuit configuration of T2D in the top row of the group of rows 306 in the single signal type transmission tunable circuit configuration table 302 shown in FIG. 3.

Upon identifying the optimal tunable circuit configuration within the tunable circuit configuration table associated with the current wireless operation, the dynamic wireless antenna coexistence control system in an embodiment may transmit instructions to one or more interference controllers to place one or more tunable impedance matching circuits in the identified optimal tunable circuit configuration. For example, and with reference to FIG. 2, if the dynamic wireless antenna coexistence control system 132 in an embodiment determines the mobile information handling system is transmitting a WWAN signal via the WWAN main antenna 250 only, it may transmit instructions to the first interference controller 220 to set the capacitance or inductance of the second tunable circuit 234 to the default impedance value according to the optimal tunable circuit configuration "T2D" identified directly above. By operating only the second tunable impedance matching circuit in an embodiment, the dynamic wireless antenna coexistence control system may conserve power that would otherwise be directed toward operation of other tunable impedance matching circuits (e.g., the first, third, fourth, fifth, and sixth tunable impedance matching circuits 232, 236, 260, 262, and 264).

Returning to FIG. 8, at block 818, the dynamic wireless antenna coexistence control system in an embodiment may set the capacitance or inductance of the fifth tunable circuit according to a default impedance value or in order to decrease deleterious effects of co-location interference. In an embodiment in which the mobile information handling system is transmitting one WWAN signal via the WWAN auxiliary antenna according to a WWAN 1×1 operation, the dynamic wireless antenna co-existence control system in an embodiment may identify the optimal tunable circuit configuration by reference to the single signal type transmission tunable circuit configuration table 302 shown in FIG. 3. For example, the dynamic wireless antenna coexistence control system in such an embodiment may identify the optimal tunable circuit configuration of T5D in the bottom row of the group of rows 306 in the single signal type transmission tunable circuit configuration table 302 shown in FIG. 3.

Upon identifying the optimal tunable circuit configuration within the tunable circuit configuration table associated with the current wireless operation, the dynamic wireless antenna coexistence control system in an embodiment may transmit instructions to one or more interference controllers to place one or more tunable impedance matching circuits in the identified optimal tunable circuit configuration. For example, and with reference to FIG. 2, if the dynamic wireless antenna coexistence control system 132 in an embodiment determines the mobile information handling system is transmitting a WWAN signal via the WWAN auxiliary antenna 278 only, it may transmit instructions to the second interference controller 222 to set the capacitance or inductance of the fifth tunable circuit 262 to a default impedance value. By operating only the fifth tunable impedance matching circuit in an embodiment, the dynamic wireless antenna coexistence control system may conserve power that would otherwise be directed toward operation of other tunable impedance matching circuits (e.g., the first, second, third, fourth, and sixth tunable impedance matching circuits 232, 234, 236, 260, and 264).

Returning to FIG. 8, at block 820, the dynamic wireless antenna coexistence control system in an embodiment may set the capacitance or inductance of the second and fifth tunable circuits according to a default impedance value or in order to decrease deleterious effects of co-location interference. In an embodiment in which the mobile information handling system is transmitting a first WWAN signal via the WWAN main antenna and a second WWAN signal via the WWAN auxiliary antenna according to a WWAN 2×2 operation, the dynamic wireless antenna co-existence control system in an embodiment may identify the optimal tunable circuit configuration by reference to the single signal type transmission tunable circuit configuration table 302 shown in FIG. 3. For example, the dynamic wireless antenna coexistence control system in such an embodiment may identify the optimal tunable circuit configuration of T2D+T5D in row 310 in the single signal type transmission tunable circuit configuration table 302 shown in FIG. 3.

Upon identifying the optimal tunable circuit configuration within the tunable circuit configuration table associated with the current wireless operation, the dynamic wireless antenna coexistence control system in an embodiment may transmit instructions to one or more interference controllers to place one or more tunable impedance matching circuits in the identified optimal tunable circuit configuration. For example, and with reference to FIG. 2, if the dynamic wireless antenna coexistence control system 132 in an embodiment determines the mobile information handling system is transmitting a first WWAN signal via the WWAN main antenna 250 and a second WWAN signal via the WWAN auxiliary antenna 278, it may transmit instructions to the first interference controller 220 to set the capacitance or inductance of the second tunable circuit 234 to achieve the default impedance value and transmit instructions to the second interference controller 222 to set the capacitance or inductance of the fifth tunable circuit 262 to achieve the default impedance value. By operating only the second and fifth tunable impedance matching circuits in an embodiment, the dynamic wireless antenna coexistence control system may conserve power that would otherwise be directed toward operation of other tunable impedance matching circuits (e.g., the first, third, fourth, and sixth tunable impedance matching circuits 232, 236, 260, and 264).

Returning to FIG. 8, at block 822, if the dynamic wireless antenna coexistence control system determines both WLAN and WWAN signals are being simultaneously transmitted, the dynamic wireless antenna coexistence control system may then determine the optimal tunable circuit configuration for multiple types of signals. As described above, when only one type of signal is being transmitted (e.g. only WLAN, or only WWAN), no co-location interference may occur between WLAN and WWAN signals, and thus, all tunable circuit configurations may involve setting impedances of tunable impedance matching circuits receiving signals to maximize efficiency. However, when more than one type of signal is being transmitted simultaneously (e.g. WLAN and WWAN), co-location interference issues may arise. In such scenarios, the dynamic wireless antenna coexistence control system may identify an optimal tunable circuit configuration that involves setting the impedances of one or more tunable impedance matching circuits to decrease the deleterious effects of colocation interference, rather than at the default impedance value, or by shunting two affected signals together via an S-CRDN as described in greater detail below with reference to FIGS. 9 and 10. The method of FIG. 8 may then end.

Figure 9:
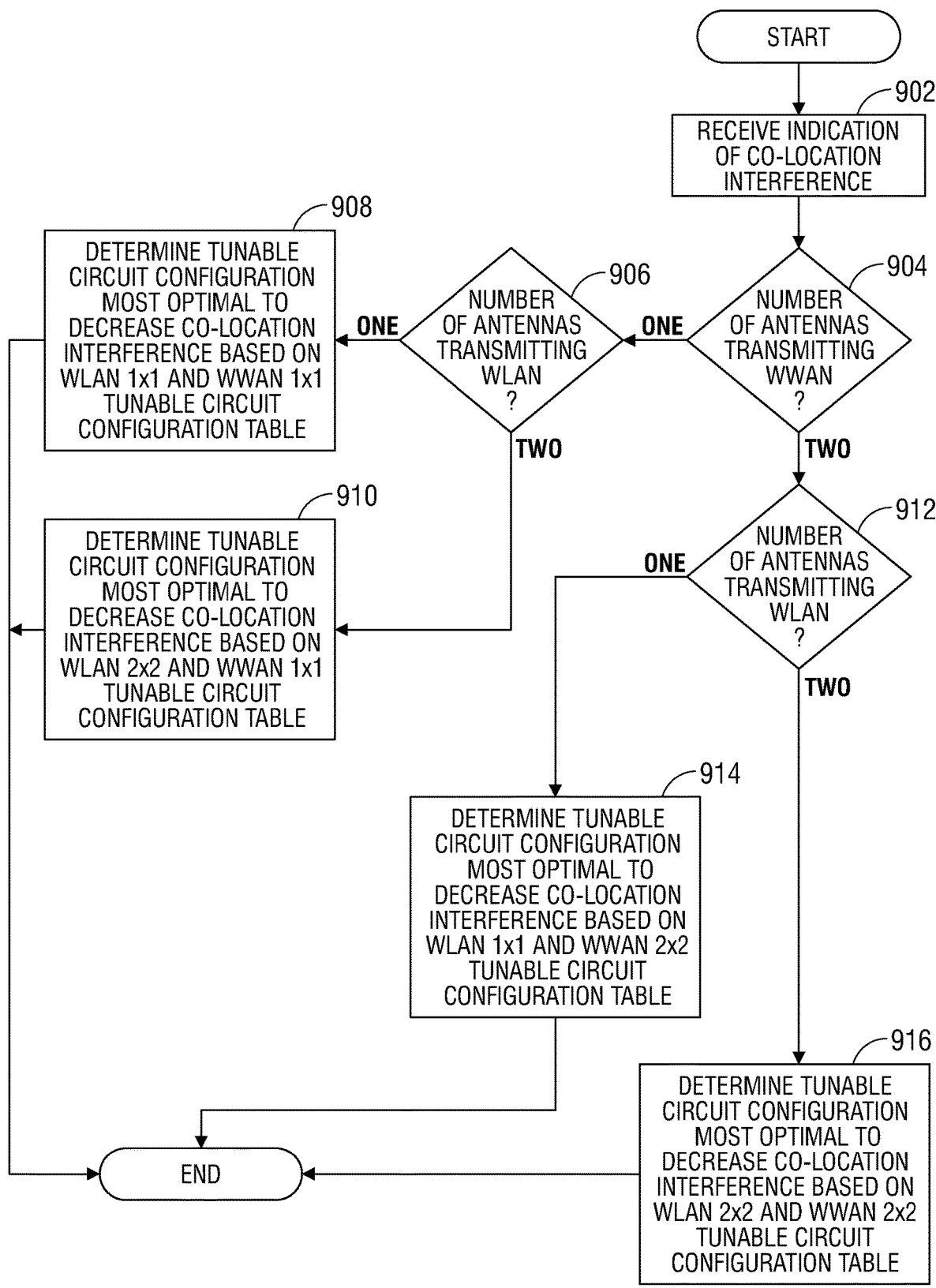
FIG. 9 is a flow diagram illustrating a method of identifying an optimal tunable circuit configuration according to an embodiment of the present disclosure.

FIG. 9 is a flow diagram illustrating a method of identifying an optimal tunable circuit configuration based on a current Wi-Fi operating mode according to an embodiment of the present disclosure. As described above, when co-location interference is not an issue in an embodiment, the mobile information handling system may transmit WLAN/WWAN signals conditioned with the default impedance value. In contrast, in embodiments in which co-location interference is detected, the dynamic wireless antenna coexistence control system may employ an optimal tunable circuit configuration that includes one or more tunable impedance matching circuits set to decrease the deleterious effects of co-location interference. The method of FIG. 9 describes how the dynamic wireless antenna coexistence control system in an embodiment may identify an optimal tunable circuit configuration when an indication of co-location interference has been received.

At block 902, in an embodiment, the dynamic wireless antenna coexistence control system may receive an indication of co-location interference. For example, with reference to FIG. 2, the dynamic wireless antenna coexistence control system 132 in an embodiment may receive an indication from the host processor 202 via the GPIO line 214 that a WLAN signal being transmitted by the WLAN main antenna 242 is causing co-location interference to a WWAN signal being received by the WWAN main antenna 250, or vice-versa. As another example, the dynamic wireless antenna coexistence control system 132 in an embodiment may receive an indication from the host processor 202 via the GPIO line 214 that a WLAN signal being transmitted by the WLAN auxiliary antenna 270 is causing co-location interference to a WWAN signal being received by the WWAN auxiliary antenna 278. The indication of co-location interference transmitted from the host processor 202 in such an embodiment may also include an identification of which of the currently transmitted signals is causing the interference. The host processor 202 in an embodiment may make this determination by identifying the signal that has not undergone a recent significant drop in quality, such as RSSI, SNR, throughput, or other metrics. Co-location interference issues arise when two antennas transceiving two different signals are placed in close proximity to one another, and the transmission or reception of one of the signals causes extreme interference to the other signal and/or vice versa, such that one or both signals becomes unusable. Possible solutions for co-location interference involve decreasing power to the aggressor signal causing the co-location interference and/or applying a low-pass or bandpass filter to the received/affected signal.

Current solutions to detected co-location interference between WLAN and WWAN signals simultaneously transceived in a mobile information handling system involve decreasing power to the aggressor signal, which effectively reduces the co-location interference, but also decreases the signal quality of the aggressor signal below usable levels. Thus, current solutions involve ceasing to simultaneously transmit both a useable WLAN signal and a useable WWAN signal. However, by routing the received/affected signal through one or more tunable impedance matching circuits with impedances set to decrease the deleterious effects of the co-location interference, the tunable impedance matching circuit removes the co-location interference without compromising the signal quality of the aggressor signal.

In order to implement this response to a detected co-location interference, the dynamic wireless antenna coexistence control system in an embodiment may first identify the current wireless operation. The dynamic wireless antenna co-existence control system in an embodiment may identify the optimal tunable circuit configuration by reference to one or more tunable circuit configuration tables describing optimal tunable circuit configurations for several operating conditions. Tunable circuit configuration tables in embodiments of the present disclosure may associate one or more tunable circuit combinations with a given antenna configuration. Multiple tunable circuit configuration tables may exist, with each tunable circuit configuration table describing a different operation. For example, a first tunable circuit configuration table may describe a wireless operation in which only WLAN or only WWAN is being transmitted (e.g. WLAN 1×1 or WWAN 1×1), a second tunable circuit configuration table may describe a wireless operation in which a single WLAN signal and a single WWAN signal are being transmitted (e.g. WLAN 1×1 and WWAN 1×1), a third tunable circuit configuration table may describe a wireless operation in which two WLAN signals and a single WWAN signal are being transmitted (e.g. WLAN 2×2 and WWAN 1×1), a fourth tunable circuit configuration table may describe a wireless operation in which a single WLAN signal and two WWAN signals are being transmitted (e.g. WLAN 1×1 and WWAN 2×2), and a fifth tunable circuit configuration table may describe a wireless operation in which two WLAN signals and two WWAN signals are being transmitted (e.g. WLAN 2×2 and WWAN 2×2). Thus, in order to determine the optimal tunable circuit configuration via a tunable circuit configuration table, the dynamic wireless antenna coexistence control system in an embodiment may first identify the tunable circuit configuration table associated with the current wireless operation.

Returning to FIG. 9, at block 904, the dynamic wireless antenna coexistence control system in an embodiment may determine the number of antennas that are currently transmitting WWAN. As described above at block 902, an indication of co-location interference between WWAN and WLAN signals has been received, and co-location interference may only occur if at least one WWAN signal and one WLAN signal are simultaneously transmitting. Thus, the mobile information handling system in such an embodiment may be transmitting either one or two WWAN signals. If the mobile information handling system in an embodiment is currently transmitting one WWAN signal, the method may proceed to block 906. If the mobile information handling system in an embodiment is currently transmitting two WWAN signals, the method may proceed to block 912.

At block 906, in an embodiment, the dynamic wireless antenna coexistence control system in an embodiment may determine the number of antennas that are currently transmitting WLAN. As described directly above, the mobile information handling system in an embodiment in which an indication of co-location interference has been received may be transmitting either one or two WLAN signals. If the mobile information handling system in an embodiment is currently transmitting one WLAN signal, the method may proceed to block 908. If the mobile information handling system in an embodiment is currently transmitting two WLAN signals, the method may proceed to block 910.

At block 908, in an embodiment in which the mobile information handling system is currently transmitting one WLAN signal and one WWAN signal, the dynamic wireless antenna coexistence control system may determine the tunable circuit configuration most optimal to decrease co-location interference based on reference to the WLAN 1×1 and WWAN 1×1 tunable circuit configuration table. For example, the dynamic wireless antenna coexistence control system in such an embodiment may access the WLAN 1×1 and WWAN 1×1 tunable circuit configuration table 402 shown in FIG. 4 above. The method may then end.

Returning to FIG. 9, at block 910, in an embodiment in which the mobile information handling system is currently transmitting two WLAN signals and one WWAN signal, the dynamic wireless antenna coexistence control system may determine the tunable circuit configuration most optimal to decrease co-location interference based on reference to the WLAN 2×2 and WWAN 1×1 tunable circuit configuration table. For example, the dynamic wireless antenna coexistence control system in such an embodiment may access the WLAN 2×2 and WWAN 1×1 tunable circuit configuration table 502 shown in FIG. 5 above. The method may then end.

Returning to FIG. 9 at block 912, in an embodiment, the dynamic wireless antenna coexistence control system in an embodiment may determine the number of antennas that are currently transmitting WLAN. As described directly above, the mobile information handling system in an embodiment in which an indication of co-location interference has been received may be transmitting either one or two WLAN signals. If the mobile information handling system in an embodiment is currently transmitting one WLAN signal, the method may proceed to block 914. If the mobile information handling system in an embodiment is currently transmitting two WLAN signals, the method may proceed to block 916.

At block 914, in an embodiment in which the mobile information handling system is currently transmitting one WLAN signal and two WWAN signals, the dynamic wireless antenna coexistence control system may determine the tunable circuit configuration most optimal to decrease co-location interference based on reference to the WLAN 1×1 and WWAN 2×2 tunable circuit configuration table. For example, the dynamic wireless antenna coexistence control system in such an embodiment may access the WLAN 1×1 and WWAN 2×2 tunable circuit configuration table 602 shown in FIG. 6 above. The method may then end.

Returning to FIG. 9, at block 916, in an embodiment in which the mobile information handling system is currently transmitting two WLAN signals and two WWAN signals, the dynamic wireless antenna coexistence control system may determine the tunable circuit configuration most optimal to decrease co-location interference based on reference to the WLAN 2×2 and WWAN 2×2 tunable circuit configuration table. For example, the dynamic wireless antenna coexistence control system in such an embodiment may access the WLAN 2×2 and WWAN 2×2 tunable circuit configuration table 702 shown in FIG. 7 above. The method may then end.

In other embodiments, a single tunable circuit configuration table may describe the optimal tunable circuit configuration for each possible combination of antenna configuration and detected aggressor signal, instead of the multiple tunable circuit configuration tables described herein at FIGS. 3-7. In such embodiments, the dynamic wireless antenna coexistence control system may access this single tunable circuit configuration table regardless of the wireless operation in which the mobile information handling system is currently transmitting.

Figure 10:
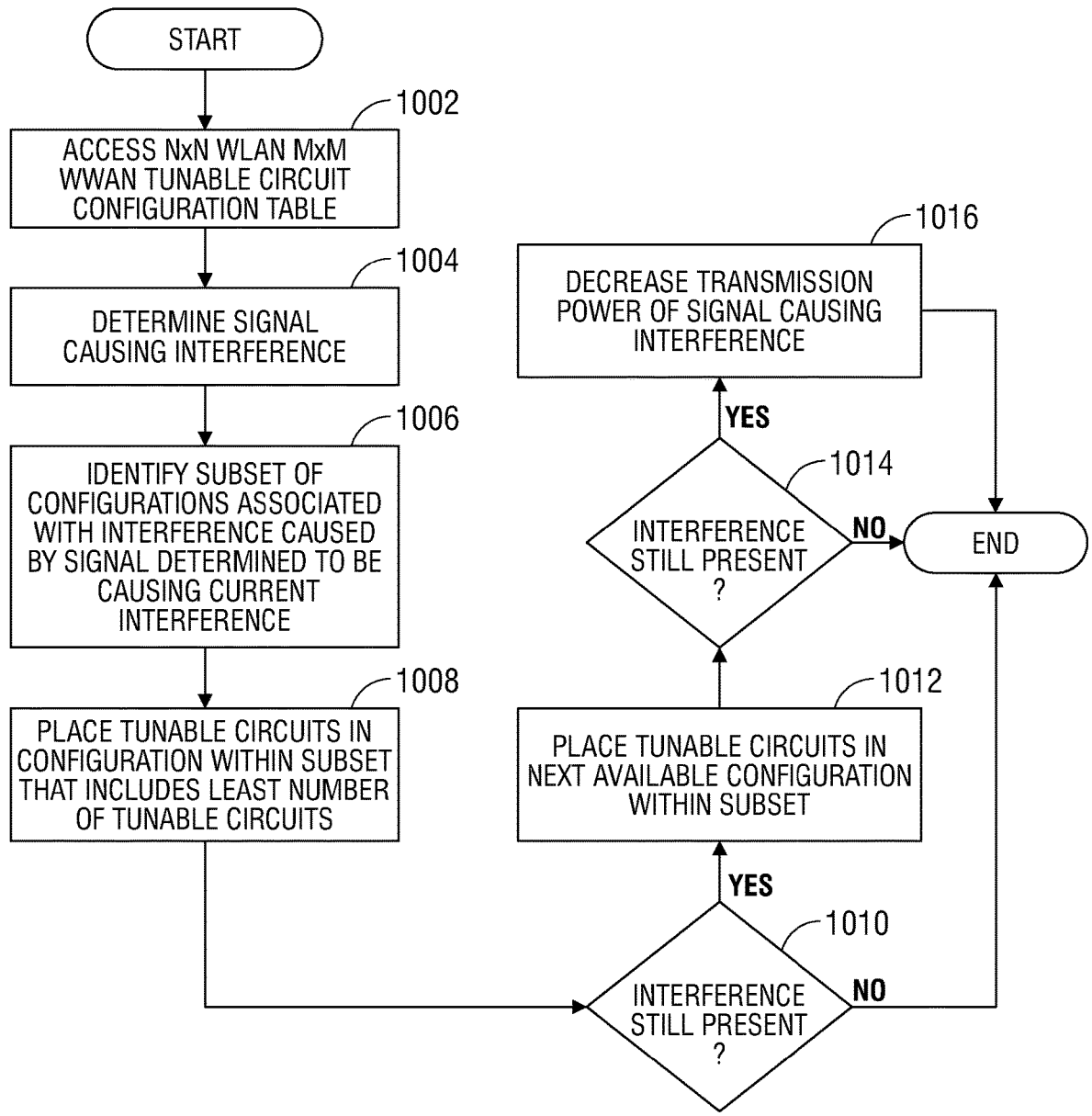
FIG. 10 is a flow diagram illustrating a method of identifying an optimal tunable circuit configuration for minimizing co-location interference according to an embodiment of the present disclosure.

FIG. 10 is a flow diagram illustrating a method of identifying an optimal tunable circuit configuration for minimizing co-location interference by reference to a MIMO tunable circuit configuration table according to an embodiment of the present disclosure. A dynamic wireless antenna coexistence control system in an embodiment may identify an optimal tunable circuit configuration pursuant to a received co-location interference indication by referencing one of a plurality of tunable circuit configuration tables associated with the wireless operation in which the mobile information handling system is currently operating. Each tunable circuit configuration table in an embodiment may associate one or more optimal tunable circuit configurations with a given antenna configuration and aggressor signal. The method of FIG. 10 describes the way in which the dynamic wireless antenna coexistence control system in an embodiment identifies the most optimal tunable circuit configuration within the tunable circuit configuration table associated with the wireless operation in which the mobile information handling system is currently operating.

At block 1002, the dynamic wireless antenna coexistence control system in an embodiment may access a tunable circuit configuration table associated with the WLAN N×N and WWAN M×M operation in which the mobile information handling system is currently operating. The choice of which tunable circuit configuration table to reference is described in greater detail above with reference to FIG. 9. N may have a value of 1 or 2, indicating either a WLAN 1×1 operation or a WLAN 2×2 operation. M may have a value of 1 or 2, indicating either a WWAN 1×1 operation or a WWAN 2×2 operation. As such, at block 1002, the dynamic wireless antenna coexistence control system in an embodiment may access the WLAN 1×1 and WWAN 1×1 tunable circuit configuration table 402 described in FIG. 4, the WLAN 2×2 and WWAN 1×1 tunable circuit configuration table 502 described in FIG. 5, the WLAN 1×1 and WWAN 2×2 tunable circuit configuration table 602 described in FIG. 6, or the WLAN 2×2 and WWAN 2×2 tunable circuit configuration table 702 described in FIG. 7. In other embodiments, only one tunable circuit configuration table may describe the optimal tunable circuit configurations available across all operations. In such an embodiment, at block 1002, the dynamic wireless antenna coexistence control system may access this single table.

At block 1004, in an embodiment, the dynamic wireless antenna coexistence control system may determine the signal causing the interference. For example, with reference to FIG. 2, the dynamic wireless antenna coexistence control system 132 in an embodiment may receive an indication from the host processor 202 via the GPIO line 214 that co-location interference is occurring between a WLAN signal being transmitted by either the WLAN main antenna 242 and/or the WLAN auxiliary antenna 270 and a WWAN signal being transmitted by either the WWAN main antenna 250 and/or the WWAN auxiliary antenna 278. The indication of co-location interference transmitted from the host processor 202 in such an embodiment may also include an identification of which of the currently transmitted signals is causing the interference. The host processor 202 in an embodiment may make this determination by identifying the signal that has not undergone a recent significant drop in quality.

Returning to FIG. 10, at block 1006, the dynamic wireless antenna coexistence control system in an embodiment may identify a subset of configurations associated with interference caused by the aggressor signal determined to be causing current co-location interference. Each tunable circuit configuration table in an embodiment may associate one or more optimal tunable circuit configurations with a given antenna configuration and aggressor signal. If multiple optimal tunable circuit configurations are available for a given antenna configuration and aggressor signal, at block 1006, the dynamic wireless antenna coexistence control system in an embodiment may identify these multiple configurations as the subset of configurations associated with interference caused by the aggressor signal. For example, with reference to FIG. 4, if dynamic wireless antenna coexistence control system in an embodiment accesses the WLAN 1×1 and WWAN 1×1 tunable circuit configuration table 402, it may identify a subset of two optimal tunable circuit configurations shown in the first two rows of the group of rows 404 associated with a first combination of an antenna configuration and an identified aggressor signal. The first combination of an antenna configuration and an identified aggressor signal associated with the subset of two optimal tunable circuit configurations shown in the first two rows of the group of rows 404 includes a WLAN aggressor signal and an antenna configuration in which the WLAN main antenna is transmitting a first WLAN signal, the WWAN main antenna is transmitting a first WWAN signal, and both auxiliary antennas are turned off. Similarly, the third and fourth rows of the group of rows 404 describes a subset of two optimal tunable circuit configurations for a second combination of an antenna configuration and an identified aggressor signal, the first and second rows of the group of rows 406 describes a subset of two optimal tunable circuit configurations for a third combination of an antenna configuration and an identified aggressor signal, and the third and fourth rows of the group of rows 406 describes a subset of two optimal tunable circuit configurations for a fourth combination of an antenna configuration and an identified aggressor signal.

As another example, with reference to FIG. 5, if dynamic wireless antenna coexistence control system in an embodiment accesses the WLAN 2×2 and WWAN 1×1 tunable circuit configuration table 502, it may identify a subset of two optimal tunable circuit configurations shown in the first two rows of the group of rows 504 associated with a first combination of an antenna configuration and an identified aggressor signal. The first combination of an antenna configuration and an identified aggressor signal associated with the subset of two optimal tunable circuit configurations shown in the first two rows of the group of rows 504 includes a WLAN aggressor signal and an antenna configuration in which the WLAN main antenna is transmitting a first WLAN signal, the WLAN auxiliary antenna is transmitting a second WLAN signal, the WWAN main antenna is transmitting a first WWAN signal, and the WWAN auxiliary antenna is turned off. Similarly, the third and fourth rows of the group of rows 504 describes a subset of two optimal tunable circuit configurations for a second combination of an antenna configuration and an identified aggressor signal, and the first through fourth rows of the group of rows 506 describes a subset of four optimal tunable circuit configurations for a third combination of an antenna configuration and an identified aggressor signal.

As another example, with reference to FIG. 6, if dynamic wireless antenna coexistence control system in an embodiment accesses the WLAN 1×1 and WWAN 2×2 tunable circuit configuration table 602, it may identify a subset of four optimal tunable circuit configurations shown in the first four rows of the group of rows 604 associated with a first combination of an antenna configuration and an identified aggressor signal. The first combination of an antenna configuration and an identified aggressor signal associated with the subset of two optimal tunable circuit configurations shown in the first two rows of the group of rows 404 includes a WLAN aggressor signal and an antenna configuration in which the WLAN main antenna is transmitting a first WLAN signal, the WWAN main antenna is transmitting a first WWAN signal, the WWAN auxiliary antenna is transmitting a second WWAN signal, and the WLAN auxiliary antenna is turned off. Similarly, the first and second rows of the group of rows 606 describes a subset of two optimal tunable circuit configurations for a third combination of an antenna configuration and an identified aggressor signal, and the third and fourth rows of the group of rows 606 describes a subset of two optimal tunable circuit configurations for a fourth combination of an antenna configuration and an identified aggressor signal.

As yet another example, with reference to FIG. 7, if dynamic wireless antenna coexistence control system in an embodiment accesses the WLAN 2×2 and WWAN 2×2 tunable circuit configuration table 702, it may identify a subset of four optimal tunable circuit configurations shown in the group of rows 704 associated with a first combination of an antenna configuration and an identified aggressor signal. The first combination of an antenna configuration and an identified aggressor signal associated with the subset of four optimal tunable circuit configurations shown in the first four rows of the group of rows 704 includes a WLAN aggressor signal and an antenna configuration in which the WLAN main antenna is transmitting a first WLAN signal, the WLAN auxiliary antenna is transmitting a second WLAN signal, the WWAN main antenna is transmitting a first WWAN signal, and the WWAN auxiliary antenna is transmitting a second WWAN signal. Similarly, the dynamic wireless antenna coexistence control system in an embodiment may identify a subset of four optimal tunable circuit configurations shown in the group of rows 706 associated with a second combination of an antenna configuration and an identified aggressor signal. The second combination of an antenna configuration and an identified aggressor signal may differ from the first combination of an antenna configuration and an identified aggressor signal only in the identity of the aggressor signal.

In other embodiments, the tunable circuit configuration table accessed at block 1002 may associate only one optimal tunable circuit configuration with a given antenna configuration and aggressor signal. In such embodiments, block 1006 may be skipped.

Returning to FIG. 10, at block 1008, the dynamic wireless antenna coexistence control system in an embodiment may place the tunable circuits in the configuration within the identified subset that includes the least number of tunable circuits. As described above, upon identifying the optimal tunable circuit configuration within the tunable circuit configuration table associated with the current wireless operation, the dynamic wireless antenna coexistence control system in an embodiment may transmit instructions to one or more interference controllers to place one or more tunable impedance matching circuits in the identified optimal tunable circuit configuration. The dynamic wireless antenna coexistence control system in an embodiment may identify a plurality of optimal tunable circuit configurations for a given set of conditions, as described above with reference to block 1006. Each of the optimal tunable circuit configurations within a subset differs from another in one or both of the following ways: (1) one optimal tunable circuit configuration may include more tunable impedance matching circuits than another; and (2) two configurations may include the same total number of tunable impedance matching circuits, but one configuration may dedicate two impedance matching control circuits to one or more WLAN signals while another configuration may dedicate two impedance matching control circuits to one or more WWAN signals instead.

Passing the affected signal through more than one tunable impedance matching circuits may decrease the co-location interference more than passing it through only a single tunable impedance matching circuit, but may also require more battery power to operate multiple tunable impedance matching circuits simultaneously. In some embodiments, the dynamic wireless antenna coexistence control system may initially attempt to eliminate the co-location interference using the lowest number of tunable impedance matching circuits and may only move to a configuration employing a plurality of tunable impedance matching circuits where routing the affected signal through only a single tunable impedance matching circuit does not eliminate or lessen the co-location interference below manageable levels.

For example, with reference to FIG. 4, the subset of two optimal tunable circuit configurations shown in the first two rows of the group of rows 404 of the WLAN 1×1 and WWAN 1×1 tunable circuit configuration table 402 includes a first configuration applying only one tunable impedance matching circuit (T2) acting to alter the impedance of an affected signal so as to increase rejection and maximize power transfer in order to decrease the deleterious effects of co-location interference, while the second configuration applies two tunable impedance matching circuits (T2 and T3) where T3 is an S-CRDN acting to shunt the affected/received WWAN signal and the aggressor/transmitting WLAN signal in order to further decrease the deleterious effects of co-location interference.

Returning to FIG. 10, at block 1008, the dynamic wireless antenna coexistence control system in an embodiment may identify as most optimal the first tunable circuit configuration within the identified subset applying only one tunable impedance matching circuit (T2) acting to alter the impedance of an affected signal so as to increase rejection and maximize power transfer in order to decrease the deleterious effects of co-location interference. In such a way, the dynamic wireless antenna coexistence control system in an embodiment may decrease the co-location interference caused by the aggressor signal while avoiding unnecessary power draws to more than one tunable impedance matching circuit.

At block 1010, in an embodiment, the dynamic wireless antenna coexistence control system may determine whether the identified co-location interference is still present. This may include waiting for receipt of a second indication of co-location interference identifying the same aggressor signal from the host processor. If no such second indication is received, the current configuration of tunable impedance matching circuits set by the dynamic wireless antenna coexistence control system may have eliminated or decreased the earlier identified co-location interference below manageable levels, and the process may end. If a second indication is received identifying the same aggressor signal, the method may proceed to block 1012.

At block 1012, in an embodiment, the dynamic wireless antenna coexistence control system may place the tunable circuits in the next available configuration within the identified subset of possible optimal tunable circuit configurations. For example, if passing the received/affected signal through a first tunable impedance matching circuit did not alleviate the issues associated with co-location interference, the dynamic wireless antenna coexistence control system may further shunt the received/affected signal and the transmitting/aggressor signal together via an S-CRDN in order to further decrease the deleterious effects of the interference. In other words, if passing the received/affected signal through one tunable impedance matching circuit does not fix the interference, passing the signal through a second tunable impedance matching circuit may help.

In a scenario in which the subset includes one optimal tunable circuit configuration that includes fewer tunable impedance matching circuits than another, the dynamic wireless antenna coexistence control system in an embodiment may have placed the tunable circuits in the configuration within that subset including the fewest number of tunable impedance matching circuits pursuant to block 1008. If this configuration failed to eliminate or decrease the identified co-location interference below manageable levels, as determined at block 1010, the dynamic wireless antenna coexistence control system may reset the tunable circuit configuration by placing the tunable impedance matching circuits in a configuration identified within the same subset of optimal configurations that includes one more tunable impedance matching circuit than the previously selected configuration. For example, with reference to FIG. 4, the subset of two optimal tunable circuit configurations shown in the first two rows of the group of rows 404 of the WLAN 1×1 and WWAN 1×1 tunable circuit configuration table 402 includes a first configuration applying only one tunable impedance matching circuit (T2) acting to alter the impedance of an affected signal so as to increase rejection and maximize power transfer in order to decrease the deleterious effects of co-location interference, while the second configuration applies two tunable impedance matching circuits (T2 and T3) both acting to alter the impedance of an affected signal so as to increase rejection and maximize power transfer in order to decrease the deleterious effects of co-location interference. If the dynamic wireless antenna coexistence control system in an embodiment determines applying only one tunable impedance matching circuit (T2) acting to alter the impedance of an affected signal so as to increase rejection and maximize power transfer in order to decrease the deleterious effects of co-location interference, it may then apply two tunable impedance matching circuits (T2 and T3) both acting to alter the impedance of an affected signal so as to increase rejection and maximize power transfer in order to decrease the deleterious effects of co-location interference.

At block 1014, in an embodiment, the dynamic wireless antenna coexistence control system may determine whether the co-location interference is still present. This may include waiting for receipt of a third indication of co-location interference identifying the same aggressor signal from the host processor. If no such third indication is received, the current configuration of tunable impedance matching circuits set by the dynamic wireless antenna coexistence control system may have eliminated or decreased the earlier identified co-location interference below manageable levels, and the process may end. If a second indication is received identifying the same aggressor signal, the method may proceed to block 1016.

At block 1018, if the dynamic wireless antenna coexistence control system in an embodiment determines routing the incoming/affected signal through a first tunable impedance matching circuit and shunting the incoming/affected signal and transmitting/aggressor signal via an S-CRDN, the dynamic wireless antenna coexistence control system in an embodiment may decrease the transmission power of the aggressor signal. As described above, current solutions to detected co-location interference between WLAN and WWAN signals simultaneously transmitted in a mobile information handling system involve decreasing power to the aggressor signal, which effectively removes the co-location interference, but also decreases the signal quality of the aggressor signal below usable levels. By routing the incoming/affected signal through a first tunable impedance matching circuit and shunting the incoming/affected signal and transmitting/aggressor signal via an S-CRDN, the tunable impedance matching circuit(s) effectively apply the low-pass filter needed to remove the co-location interference. However, if these tunable impedance matching circuits fail to decrease the co-location interference below manageable levels, the dynamic wireless antenna coexistence control system in an embodiment may be forced to sacrifice the aggressor signal by decreasing the transmission power of that signal. The method may then end.

The blocks of the flow diagrams of FIGS. 8-10 or steps and aspects of the wireless operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A mobile information handling system executing a dynamic wireless antenna co-existence control system comprising:
    a plurality of transceiving antennas transmitting plural wireless local area network (WLAN) signals and a wireless wide area network (WWAN) signals according to a preset antenna configuration, mounted in the mobile information handling system;
    a processor or network interface device executing machine readable executable code instructions of the dynamic wireless antenna co-existence control system to:
        receive an indication of co-location interference between the at least one WLAN signals and the WWAN signals, and an identification of the at least one WLAN signal as a victim signal negatively impacted by the co-location interference; and
        instruct a first interference controller operably connected to the processor or network interface device and a first tunable impedance matching circuit to route the victim signal between a first WLAN transceiving antenna and a WLAN radio modem via the first tunable impedance matching circuit, where the first tunable impedance matching circuit applies an impedance adjustment to alter impedance affecting the at least one WLAN signal at an antenna port of the first WLAN transceiving antenna.

2. The mobile information handling system of claim 1, further comprising:
    the processor or network interface device executing the code instructions to:
        receive an identification of the WWAN signals as an aggressor signal causing the co-location interference;
        instruct the first interference controller to route the aggressor signal to an antenna port for a first WWAN transceiving antenna via a second tunable impedance matching circuit applying a default impedance value; and
        instruct the first interference controller operably connected to a third tunable impedance matching circuit to where the third tunable impedance matching circuit applies a connection between the antenna port for the first WWAN transceiving antenna with the antenna port for the first WLAN transceiving antenna to reduce the co-location interference.

3. The mobile information handling system of claim 2, wherein the third tunable impedance matching circuit is a shunt type coupled resonator decoupling network.

4. The mobile information handling system of claim 1 further comprising:
    the processor or network interface device executing the machine readable executable code instructions to:
        instruct a second interference controller operably connected to the processor or network interface device and a fourth tunable impedance matching circuit to route the victim signal from a second WLAN transceiving antennas to the WLAN radio modem via the fourth tunable impedance matching circuit, where the fourth tunable impedance matching circuit applies an impedance adjustment to alter impedance affecting a second WLAN signal at an antenna port for the second WLAN transceiving antenna.

5. The mobile information handling system of claim 4 further comprising:
the processor or network interface device executing code instructions to:
instruct the second interference controller to route the aggressor signal to an antenna port for a second WWAN transceiving antenna via a fifth tunable impedance matching circuit applying a default impedance value; and
instruct the second interference controller operably connected to a sixth tunable impedance matching circuit, where the sixth tunable impedance matching circuit applies a connection between the antenna port for the second WWAN transceiving antenna with an antenna port for the second WLAN transceiving antenna to reduce co-location interference.

6. The mobile information handling system of claim 1, wherein the first interference controller sets an impedance of the first tunable impedance matching circuit by setting a capacitance of the first tunable impedance matching circuit.

7. The mobile information handling system of claim 1, wherein the first interference controller sets an impedance of the first tunable impedance matching circuit by setting an inductance of the first tunable impedance matching circuit.

8. A method of dynamically decreasing collocation interference between wireless signals in a mobile information handling system comprising:
transmitting a wireless local area network (WLAN) signal and plural wireless wide area network (WWAN) signals via a plurality of transceiving antennas mounted in a small form factor case for the mobile information handling system according to a preset antenna configuration;
receiving an indication of co-location interference between the the WLAN signal and at least one WWAN signal of the plural WWAN signals, and an identification of the WLAN signals as a victim signal negatively impacted by the co-location interference;
instructing a first interference controller of a network interface device operably connected to a processor and a first tunable impedance matching circuit to route the victim signal from a first WLAN transceiving antenna to a WLAN radio modem via the first tunable impedance matching circuit, where;
the first tunable impedance matching circuit is to apply an impedance adjustment to alter impedance affecting the WLAN signal at an antenna port for the first WLAN transceiving antenna.

9. The method of claim 8 further comprising:
receiving an identification of the one of the plural WWAN signals as an aggressor signal causing the co-location interference; and
instructing the first interference controller to route the aggressor signal to the antenna port for the first WWAN transceiving antenna via a second tunable impedance matching circuit applying a default impedance value; and
instructing the first interference controller operably connected to a third tunable impedance matching circuit, where the third tunable impedance matching circuit applies a connection between the antenna port for a first WWAN transceiving antenna with the antenna port for the first WLAN transceiving antenna to reduce the co-location interference.

10. The method of claim 9, wherein the third tunable impedance matching circuit is a shunt type coupled resonator decoupling network.

11. The method of claim 8 further comprising:
instructing a second interference controller and a fourth tunable impedance matching circuit to route the victim signal from a second WLAN transceiving antenna to the WLAN radio modem via the fourth tunable impedance matching circuit, where
the fourth tunable impedance matching circuit applies an impedance adjustment to alter impedance affecting a second WLAN signal at an antenna port for the second WLAN transceiving antenna.

12. The method of claim 11 further comprising:
instructing the second interference controller to route the aggressor signal to the antenna port for the second WWAN transceiving antenna via a fifth tunable impedance matching circuit applying a default impedance value; and
instructing the second interference controller operably connected to a sixth tunable impedance matching circuit to set the sixth tunable impedance matching circuit to apply a connection between the antenna port for the second WWAN transceiving antenna with the antenna port for the second WLAN transceiving antenna to reduce the co-location interference.

13. The method of claim 8, wherein the first interference controller sets an impedance of the first tunable impedance matching circuit by setting a capacitance of the first tunable impedance matching circuit.

14. The method of claim 8, wherein the first interference controller sets an impedance of the first tunable impedance matching circuit by setting an inductance of the first tunable impedance matching circuit.

15. A mobile information handling system executing a dynamic wireless antenna co-existence control system comprising:
a plurality of transceiving antennas transmitting plural wireless local area network (WLAN) signals and a wireless wide area network (WWAN) signal according to a preset antenna configuration, mounted in a small form factor case for the mobile information handling system;
a processor or network interface device executing machine readable executable code instructions of the dynamic wireless antenna co-existence control system to:
receive an indication of co-location interference between the at least one WLAN signal of the plural WLAN signals and the WWAN signal, and an identification of the WWAN signal as a victim signal negatively impacted by the co-location interference; and
instruct a first interference controller of the network interface device operably connected to the processor and a first tunable impedance matching circuit to route the victim signal from a first WWAN transceiving antenna to a WWAN radio modem via the first tunable impedance matching circuit, where
the first tunable impedance matching circuit applies an impedance adjustment to alter impedance affecting the WWAN signal at an antenna port for the first WWAN transceiving antenna.

16. The mobile information handling system of claim 15, further comprising:
the processor or network interface device executing code instructions to:

receive an identification of one of the plural WLAN signals as an aggressor signal causing the co-location interference;

instruct the first interference controller to route the aggressor signal to the antenna port for a first WLAN transceiving antenna via a second tunable impedance matching circuit applying a default impedance value; and instruct the first interference controller operably connected to a first shunt-type coupled resonator decoupling network to instruct the first shunt-type coupled resonator decoupling network to apply a connection between the antenna port for the first WLAN transceiving antenna with the antenna port for the first WWAN transceiving antenna to reduce the co-location interference.

17. The mobile information handling system of claim 15 further comprising:

the processor or network interface device executing the machine readable executable code instructions to:

instruct a second interference controller of the network interface device operably connected to the processor or network interface device and a fourth tunable impedance matching circuit to route the victim signal from a second WWAN transceiving antenna to the WWAN radio modem via the fourth tunable impedance matching circuit, where the fourth tunable impedance matching circuit applies an impedance adjustment to alter impedance affecting a second WWAN signal at an antenna port for the second WWAN transceiving antenna.

18. The mobile information handling system of claim 17 further comprising:

the processor or network interface device executing code instructions to:

instruct the second interference controller to route the aggressor signal to the antenna port for the second WLAN transceiving antenna via a fifth tunable impedance matching circuit applying a default impedance value; and instruct the second interference controller operably connected to a second shunt-type coupled resonator decoupling network to instruct the second shunt-type coupled resonator decoupling network to apply a connection between the antenna port for the second WLAN transceiving antenna with the antenna port for the second WWAN transceiving antenna to reduce co-location interference.

19. The mobile information handling system of claim 15, wherein the first interference controller sets an impedance of the first tunable impedance matching circuit by setting a capacitance of the first tunable impedance matching circuit.

20. The mobile information handling system of claim 15, wherein the first interference controller sets an impedance of the first tunable impedance matching circuit by setting an inductance of the first tunable impedance matching circuit.

* * * * *